(12) United States Patent
Yabloko

(10) Patent No.: US 7,634,501 B2
(45) Date of Patent: Dec. 15, 2009

(54) METHOD AND APPARATUS FOR MEDIATED COOPERATION

(75) Inventor: Leonid Yabloko, New City, NY (US)

(73) Assignee: Next Generation Software, New Cty, NY (US)

( * ) Notice: Subject to any disclaimer, the term of this patent is extended or adjusted under 35 U.S.C. 154(b) by 633 days.

(21) Appl. No.: 10/765,642

(22) Filed: Jan. 27, 2004

(65) Prior Publication Data

US 2004/0167862 A1 Aug. 26, 2004

Related U.S. Application Data

(60) Provisional application No. 60/445,202, filed on Feb. 5, 2003.

(51) Int. Cl.
*G06F 7/00* (2006.01)

(52) U.S. Cl. .................... 707/104.1; 707/10; 707/3

(58) Field of Classification Search ................. None
See application file for complete search history.

(56) References Cited

U.S. PATENT DOCUMENTS

| | | | |
|---|---|---|---|
| 5,133,068 | A | 7/1992 | Crus et al. |
| 5,530,854 | A | 6/1996 | Emery et al. |
| 5,615,309 | A | 3/1997 | Bezek et al. |
| 5,617,510 | A | 4/1997 | Keyrouz et al. |
| 5,634,124 | A | 5/1997 | Khoyi et al. |
| 5,966,386 | A | 10/1999 | Maegawa |
| 6,073,109 | A | 6/2000 | Flores et al. |
| 6,112,126 | A | 8/2000 | Hales et al. |
| 6,171,109 | B1 | 1/2001 | Phsuga |
| 6,246,998 | B1 * | 6/2001 | Matsumori ............. 705/27 |
| 6,269,473 | B1 | 7/2001 | Freed et al. |
| 6,311,194 | B1 | 10/2001 | Sheth et al. |

(Continued)

OTHER PUBLICATIONS

James McGover,UDDI Chapter 6 of Java Web Services Architecture, Jul. 2003, Morgan Kaufmann Publishers, p. 177-197.*

(Continued)

*Primary Examiner*—John E Breene
*Assistant Examiner*—Thu-Nguyet Le

(57) ABSTRACT

Mediated cooperation of entities occurs based on uniformed (canonical) representation of objects as tuples allocated for different semantic aspects of the objects. The tuples are connected to represent sequential events of one or more processes, which allow the entities to produce the objects. The conditions under which the entity can produce one or more of the objects are represented by using tuple templates. In order to implement the process, each object is associated with one or more semantic terms and one tuple named with the semantic term is allocated for every association. Allocated tuples contain the information from the object, which corresponds to the meaning of the semantic term. The goal of each process is identified by one or more of the semantic terms. The processes are then implemented by generating chains of events, which terminate at the tuples corresponding to each semantic term. The semantic terms are aggregated into general categories, which are used by the cooperating entities for the goal identification. One or more of semantic mediators are used to ensure sound formal semantics of the categories by maintaining type systems for different problem domains. The type system of each domain is based on the connected tuples forming a hyper-graph, which is used to determine formal semantics of each type.

6 Claims, 20 Drawing Sheets

U.S. PATENT DOCUMENTS

| | | | | |
|---|---|---|---|---|
| 7,133,839 | B2 * | 11/2006 | Inoue et al. | 705/27 |
| 2001/0018671 | A1 * | 8/2001 | Ogasawara | 705/26 |
| 2003/0200154 | A1 * | 10/2003 | Nishimura | 705/26 |

OTHER PUBLICATIONS

Len Yabloko, "Logic Stratification and Alignment for Heterogeneous Distributed Information Systems," Published in Proceedings 7th International Conference on Artificial Intelligence and Soft Computing, Banff, Canada (Jul. 14-17, 2003), 14 pages.

Richard Paige et al. "The Single Model Principle," Journal of Object Technology, vol. 1, No. 5, Nov.-Dec. 2002, pp. 63-81.

Aditya Agrawal et al. "Graph Transformations on Domain-Specific Models", Technical report ISIS-03-403, Vanderbilt University, Nov. 2003, 43 pages.

Anupriya Ankolekar et al. "DAML-S: Web service description for the Semantic Web," Proceedings of the International Semantic Web Conference, vol. 2342 of LNCS, Jul. 2002, pp. 348-363, 15 pages.

James Farrugia, "Logical Systems: Towards Protocols for Web-based Meaning Negotiation," AAAI 2002 Workshop on Meaning Negotiation, Jul. 2002, 4 pages.

Andrey Naumenko et al. "Two Approaches in System Modeling and Their Illustrations with MDA and RM-ODP", Proceedings of ICEIS 2003, The 5th International Conference on Enterprise Information Systems, Angers, France, Apr. 2003, pp. 398-402.

Jose M. Vidal et al. "Multiagent Systems with Workflows," IEEE Internet Computing, vol. 8, No. 1, Jan./Feb. 2004, pp. 76-82.

Chris Partridge, "Business Objects: Re-engineering for re-use," Jun. 2000, 126 pages.

* cited by examiner

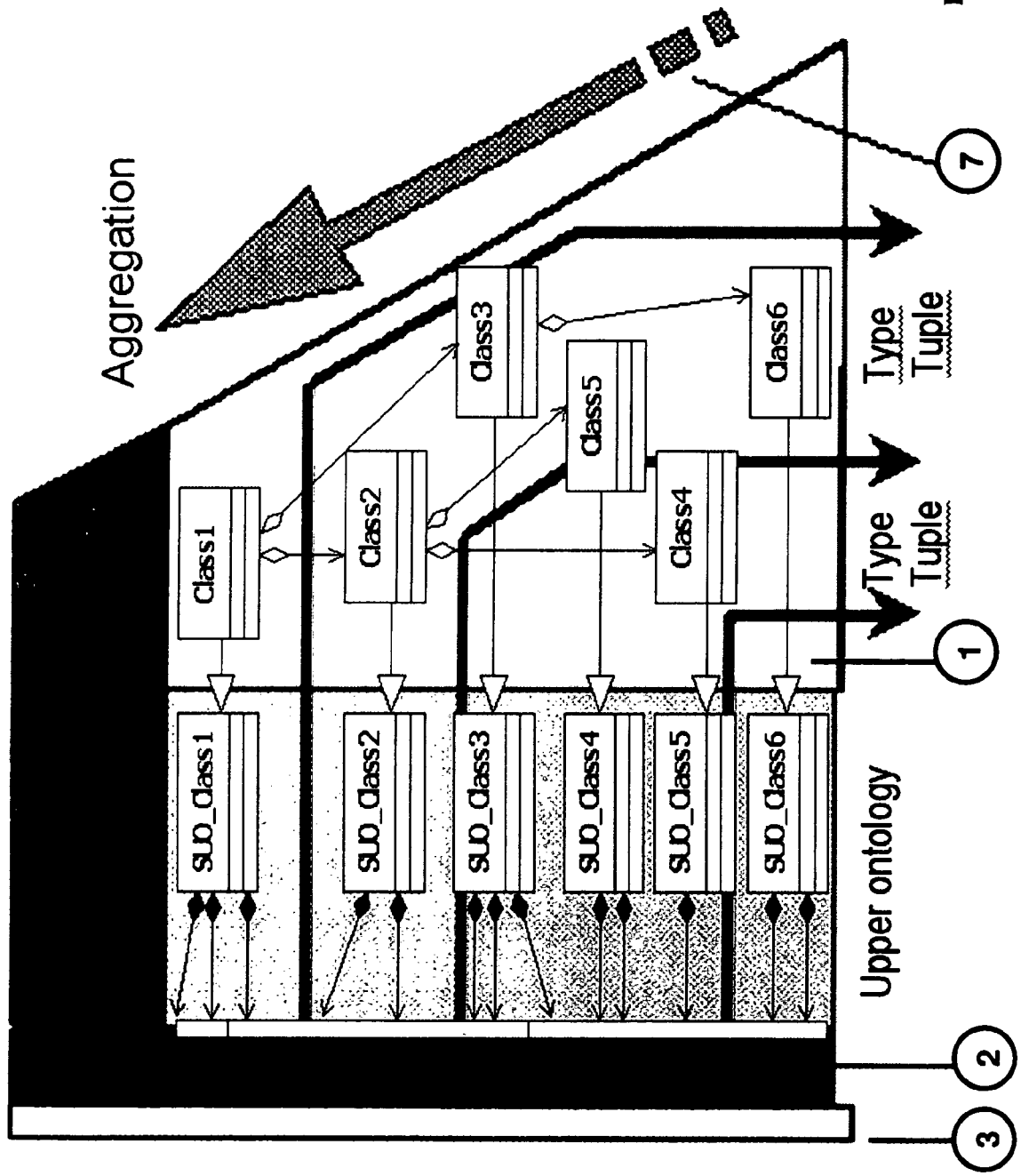

METHOD AND APPARATUS FOR MEDIATED COOPERATION

CROSS-REFERENCE TO RELATED APPLICATIONS

This application claims the benefit of U.S. Provisional Application No. 60/445,202 filed Feb. 5, 2003 entitled "METHOD AND APPARATUS FOR AUTOMATIC REASONING AND CORRESPONDING DISTRIBUTED INTELLIGENT AGENT COOPERATION PLATFORM."

COMPACT DISC APPENDIX

This patent application includes an Appendix on one compact disc having a file named appendix.txt, created on Jan. 21, 2004, and having a size of 1,267,299 bytes. The compact disc is incorporated by reference into the present patent application.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

This invention relates to the fields of Multi-Agent Systems, Distributed Computing and Information Systems.

2. Background

Process automation methods presently in use map an external (real) world onto its internal system image (model) in a way that does not preserve any distinction between things and changes, as shown in FIG. 1.

Chris Partridge in his book, "Business Objects: Re-engineering for re-use," Butterworth-Heinemann, June 1996, proposed a simple test of whether a model is representing a business or an information system. If the model's notation classifies changes in the real world as data, then it is describing an information system and not a business. Therefore, it is not a business model. Unfortunately, many so-called business models fall into this category by mapping both entities and transactions onto a system's data, and by mapping both entities and processes onto a system's programs (FIG. 1).

The problem arises later in a life cycle of the system because its operational semantics deviate farther and farther from its source (shown as a gray cone in FIG. 1) until the two semantics become incompatible. Systems encapsulate data and programs into one system object, which performs transformations of data (that represent entities) necessary in order to allow entities (involved in a process) to cooperate. Such transformations are usually private (invisible) to other entities and cannot be compensated by the system when the process or the entities are modified. Instead, the intervention of a modeler is required in order to perform semantic mapping of modifications to both system transactions and transformations (shown as a gray triangle in FIG. 1), and sometimes called re-factoring. In many cases, further intervention of an engineer is required in the implementation of such re-factoring, which also involves the semantic mapping to program code. This results in disproportional growth of the efforts required to maintain the system, and shortening of its life (known as system brittleness). This problem can also be characterized as "loss of semantic precision."

Semantics is the single unifying aspect between a large number of different systems. Yet, at the present time, no system implementation (not just modeling) methods exist which rely on a formal semantic specification of external (world) events and processes. Instead, formal semantics is used only to specify the internal system operations. For large and distributed systems, the operational semantics is broken into disparate components corresponding to different scales and locations. On the other hand, maintenance and evolution of such systems requires a single, scale and location-free semantics.

Formal Semantics is a field originated in mathematical logic by Gotlob Frege, 1892 "Uber Sinn and Bedeutung" (On sense and reference), and later developed by Bertrand Russell in the early 20th century and by Alfred Tarski in the 1950's. Tarski developed the theory of models using formal semantics that define equivalence of an agreed conceptualization of the real world to a concrete concept in the model. However, the mechanism for achieving and maintaining such an agreement for distributed systems was never proposed and formally studied. Such a mechanism would perform formal Semantic Mediation of components in a distributed system.

A "tuple" is a data object containing two or more components. Some examples of tuples of information include a record in a database, a list of properties, and a set of attributes. The concept of a "tuple" was first introduced by Gottlob Frege in the late 19th century when he defined the meaning as consisting of two components: the sense and the reference. According to Frege, a reference must be pointing to a physical extension, and sense is a set of strong (i.e., physical) references, which he called "tuple."

A strong reference as used herein is a pointer (e.g., index, address, link) to an entity that one can interact with (e.g., a buyer, a seller, a banking entity) in a formally defined way. The formal definition must assign a function to the interaction, which would be consistent with all other strong references to the entity. In contrast, a category or a subcategory in an ontology such as a Yahoo web site directory is not a strong reference since one cannot interact with it. That is, one can interact with the taxonomy of semantic terms by navigating through the branches (e.g., banking) but one cannot interact in a formally defined way with what the terms represent (e.g., an actual bank—even a hyperlink to an actual bank which might exist at the end of a branch in a directory has no formally defined function). The arrangement of abstract entities according to functions is known in computer science as type systems, and is based on the definition of type given by Bertrand Russell, the creator of Type Theory: A type is a collection of arguments for which the said function has values. Ideally, the ultimate purpose of information is to do something with the information. By definition, a strong reference must be associated with a type, which provides the necessary input for the interaction to fulfill its formal function and to result in some value. An ontology such as a Yahoo web site directory is thus ultimately limited in usefulness because it does not allow the user who is navigating through the directory to reach a strong reference.

A weak reference, on the other hand, may assign a function to the interaction in an informal way, which does not provide any consistency checking for the references. Web Services is an example of weak references. Web Services perform functions, which can be anything from a simple request to complicated business processes. The assignment of a function to a Web Service is called grounding. Grounding includes association of the service with the context of a task performed by the agent. It is facilitated by a Universal Description, Discovery and Integration (UDDI) framework and Web Service Description Language (WSDL). UDDI's description of a service does not include any capability description, limiting itself to the name, a pointer to the provider of the service and a port where to access the service. In addition, UDDI allows services to refer to so-called "TModels" that are used to link a service to technical specifications or to classification schemes. Therefore, it is possible to ask UDDI for all the services that have a WSDL scheme, but not for all the services that provide a requested functionality. Some semantic extensions are presently proposed, which defines the operations, and several layers on top of WSDL. For example, Business Process Execution Language for Web Services (BPEL4WS) defines how the operations can be sequenced. However, none of the presently existing Web Services technologies allows to specify the goal that a client may have when accessing a Web service. Goal specifications should be kept separate from actual web service descriptions because the same web service can serve different goals, and obviously different (competing) web services can serve the same goal. For example, Amazon.com could be used to buy a book, however, in the same way it can be used as an information broker on bibliographic information about books. Conversely, different bookstores may subscribe to the same goal.

Presently several technologies exist which directly rely on tuples for information processing. These are using computational model developed in the 1980's at Yale University by David Gelernter et al., and are based on "Tuple Space." A "Tuple Space" is a shared persistent memory in which clients may read, write, and take objects represented by tuples. Clients selectively choose which objects they read and take by tuple template matching. Existing Tuple Space-based technologies such as SUN's JavaSpaces, IBM's TSpaces, however, do not provide sound formal semantics for tuples of Tuple Space. That is, formal semantics are only provided for operations of Tuple Space, but not for individual tuples, even though each tuple can incorporate a strong reference (and usually does). In order to provide sound formal semantics for individual tuples, the types associated with tuples must have consistent sets of strong references from all tuples associated with each type. The consistency criteria must allow for formal proof procedure. According to Frege, a set of strong references comprises the sense of a semantic term. Therefore, the sound formal semantics of tuples must place constraints on semantic terms used to allocate tuples in Tuple Space. This is not the case for any existing Tuple Space-based technology.

BRIEF SUMMARY OF THE INVENTION

The present invention discloses a method and apparatus for goal-oriented cooperation of entities based on representing objects by tuples allocated for each semantic aspect of the object, and representing the condition under which entities can produce objects by tuple templates. According to the present invention, the goals are set by identifying a set of aspects. Then, to satisfy the goal, chains of connected tuples are generated using tuple templates, and representing sequential events of one or more processes, which consume the objects comprising initial conditions and produce the objects represented by tuples at the end of each chain.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The foregoing summary, as well as the following detailed description of preferred embodiments of the invention, will be better understood when read in conjunction with the appended drawings. For the purpose of illustrating the invention, there is shown in the drawings embodiments which are presently preferred. However, the invention is not limited to the precise arrangements and instrumentalities shown.

In the drawings:

FIG. 1 shows a prior art depiction of an imprecise image of business.

FIG. 2 shows cooperating entities (agents) in accordance with one preferred embodiment of the present invention.

FIG. 3 shows the conventional use of the Model-Driven Architecture (MDA).

FIG. 4 shows a prior art use of DAML-S extensions of WSDL to enable agent cooperation.

FIG. 5 shows a chain of events enabled by cooperating entities in accordance with one preferred embodiment of the present invention.

FIG. 6 shows two streams comprised of tuples and keys used to generate a chain of events in accordance with one preferred embodiment of the present invention.

FIG. 7 shows the general organization of a type container encapsulating all system objects as tuples or keys in accordance with one preferred embodiment of the present invention.

FIG. 8 shows recovery of lost precision by building a single consistent image of business as a stream in accordance with one preferred embodiment of the present invention.

FIG. 9 shows a prior art entity representation by system object containers.

FIG. 10 shows a frame ontology generated by reverse engineering of a database in accordance with one preferred embodiment of the present invention.

FIG. 11 shows the use of M0-M3 meta-levels to implement tuple types in accordance with one preferred embodiment of the present invention.

Figure 12:
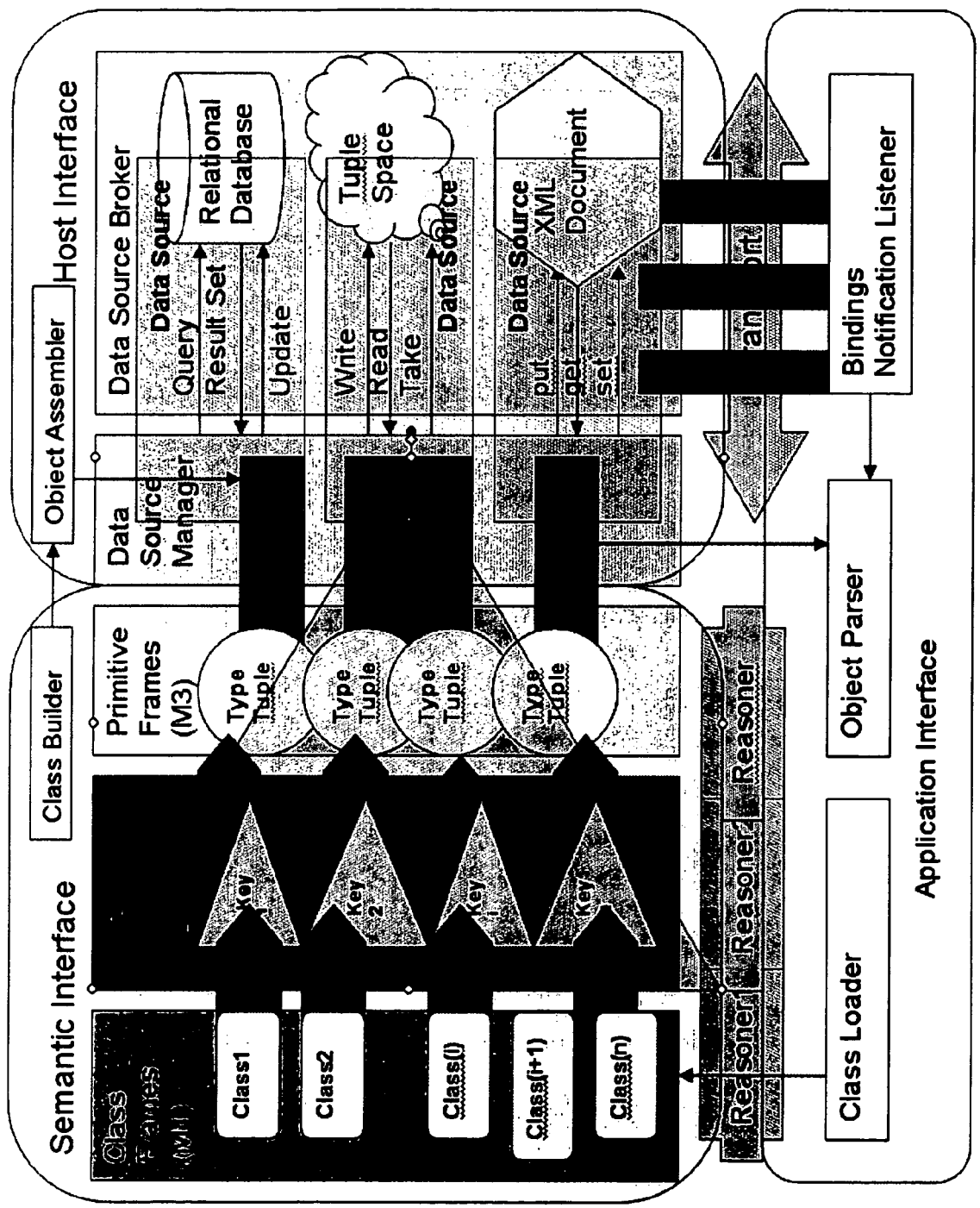

FIG. 12 shows jointly hosted type containers in accordance with one preferred embodiment of the present invention.

Figure 13:
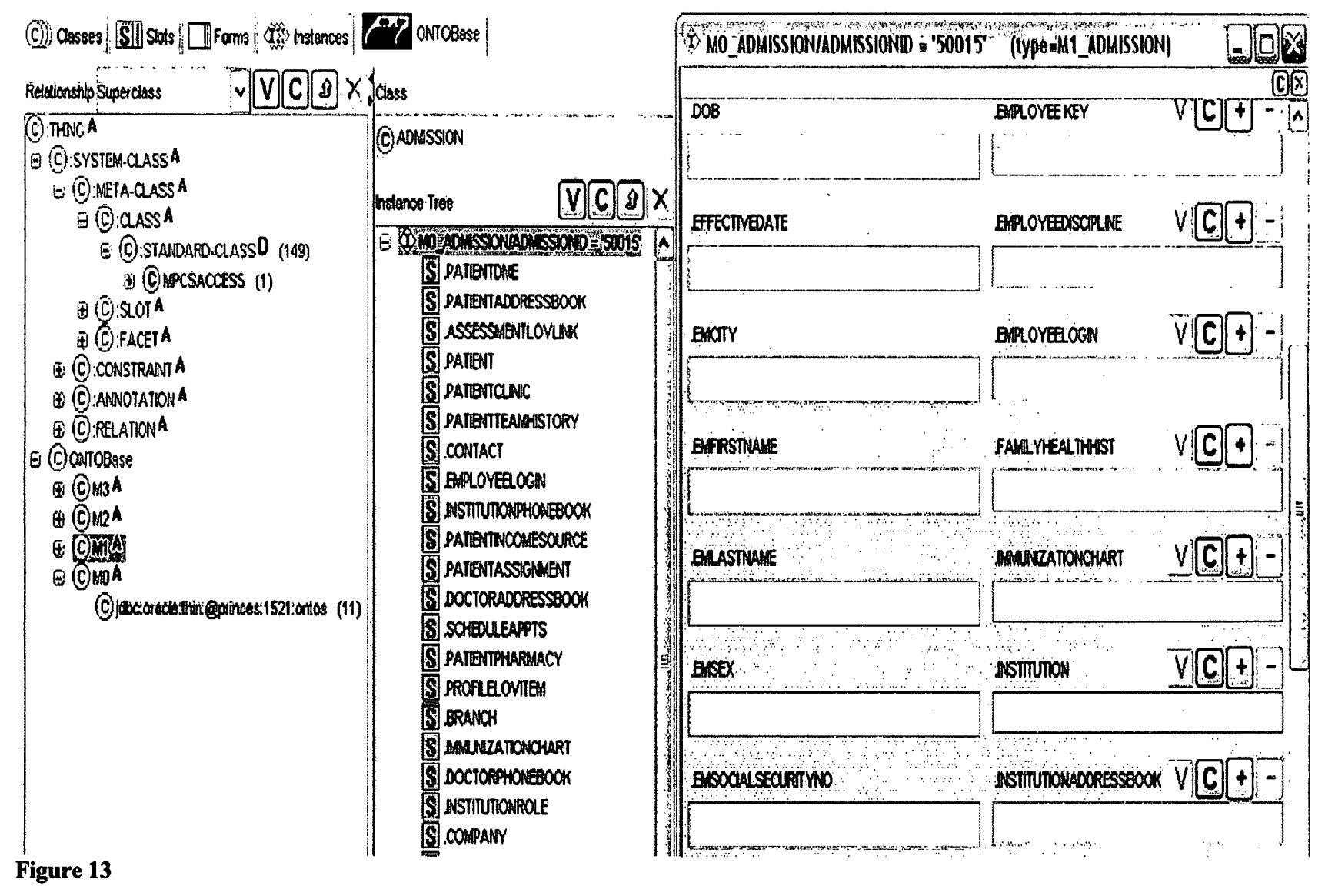

FIG. 13 shows allocation of a tuple representing the object associated with the semantic term "ADMISSION" in accordance with one preferred embodiment of the present invention.

Figure 14:
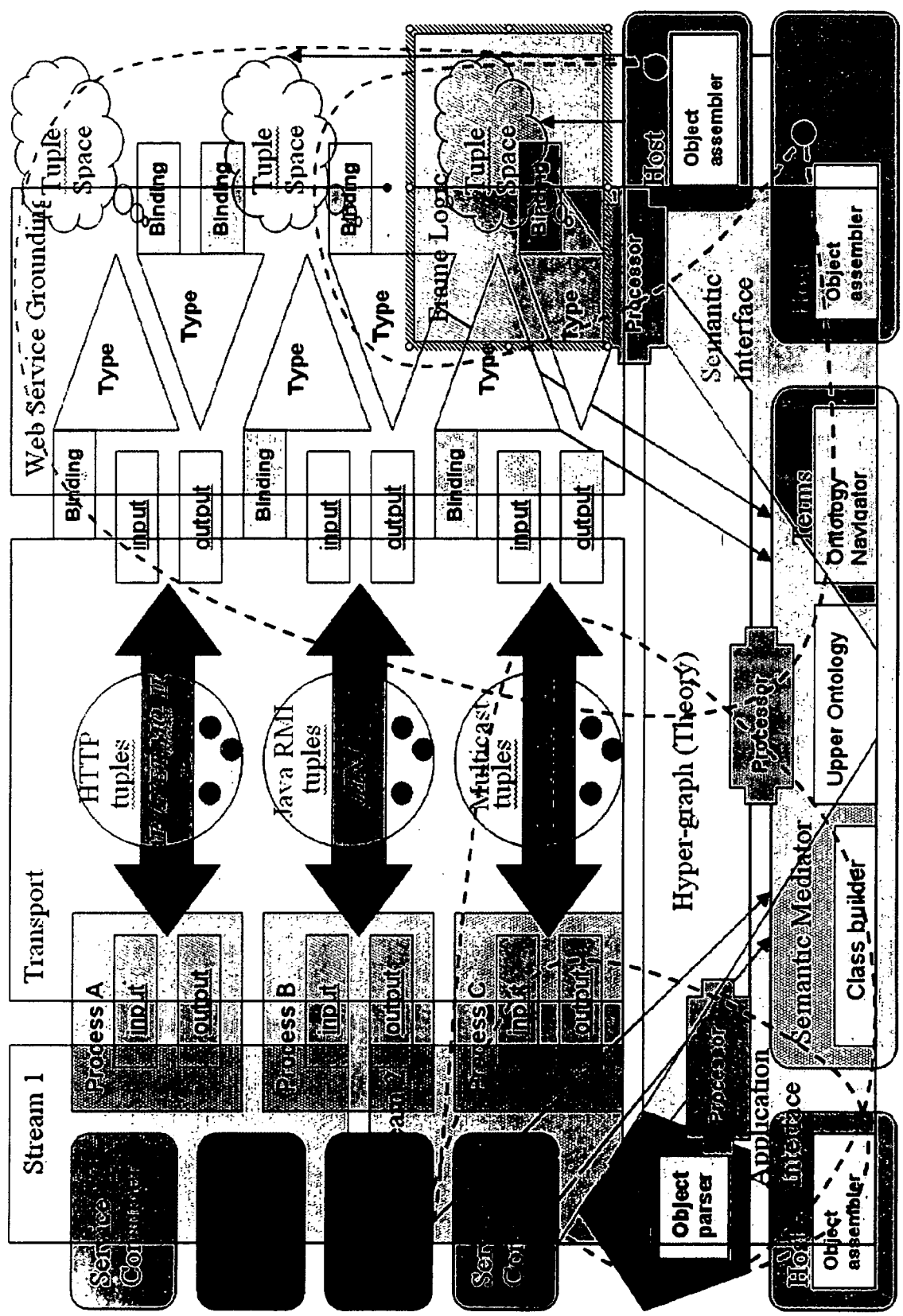

FIG. 14 shows a Semantic Web implementation in accordance with one preferred embodiment of the present invention.

Figure 15:
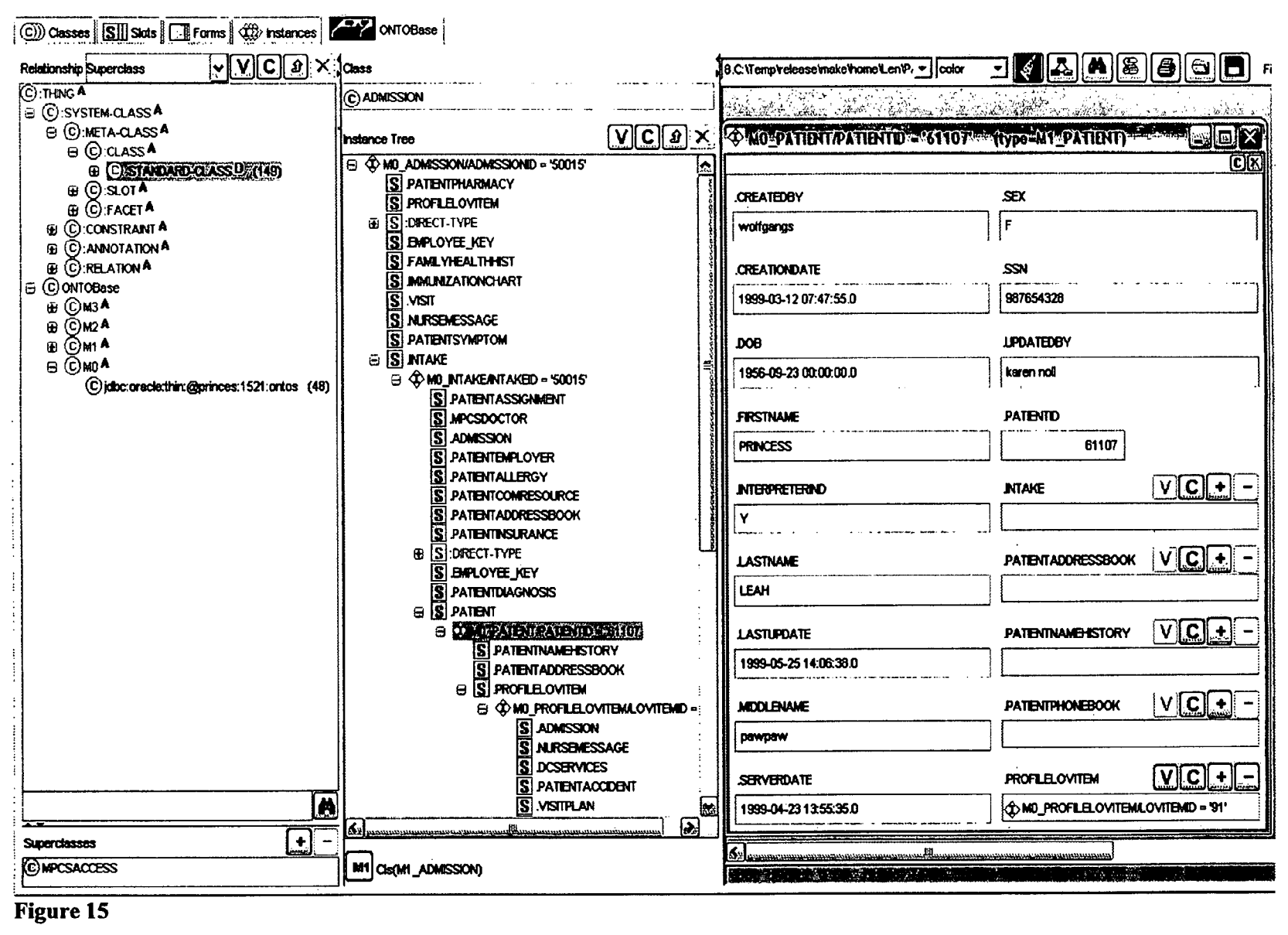

FIG. 15 shows a simple chain of events generated by a frame system in the form of a tree path connecting a source tuple with a target tuple in accordance with one preferred embodiment of the present invention.

Figure 16:
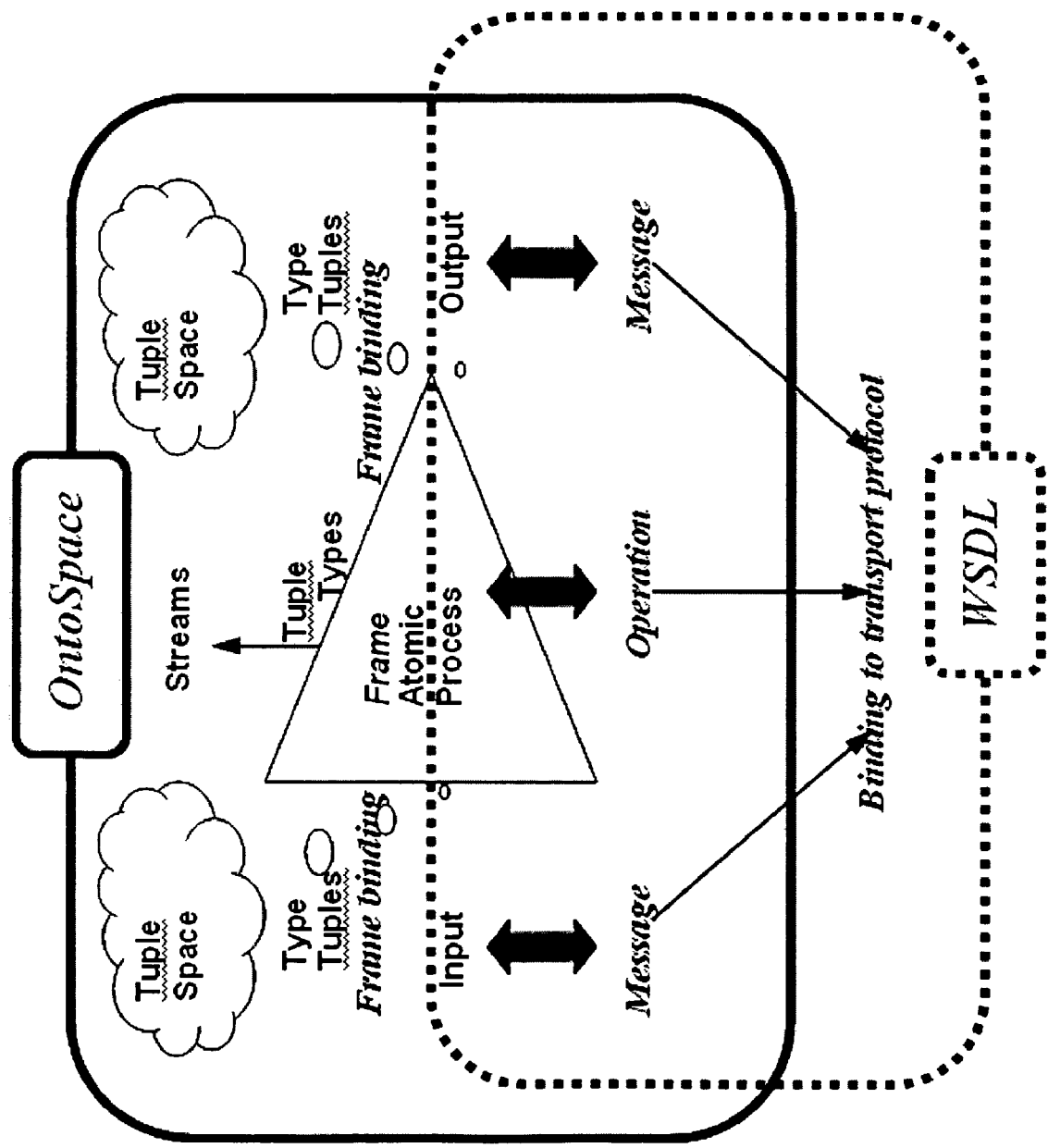

FIG. 16 shows Grounding of Web Services with the architecture based on the present invention (called "OntoSpace") in accordance with one preferred embodiment of the present invention.

FIG. 17-20 shows "OntoSpace" architecture for global computing in accordance with one preferred embodiment of the present invention.

DETAILED DESCRIPTION OF THE INVENTION

Certain terminology is used herein for convenience only and is not to be taken as a limitation on the present invention.

I. Overview of Present Invention

The present invention is a novel method of allowing entities to cooperate for implementing one or more processes by generating chains of events in order to produce the objects comprising the goal of each process. According to the invention, any object that the entity can produce for consumption by other entities taking part in cooperation or for satisfying the goal of any process is represented by one or more tuples. The conditions under which the entity can produce one or more of the objects are represented by tuple templates.

Figure 2:
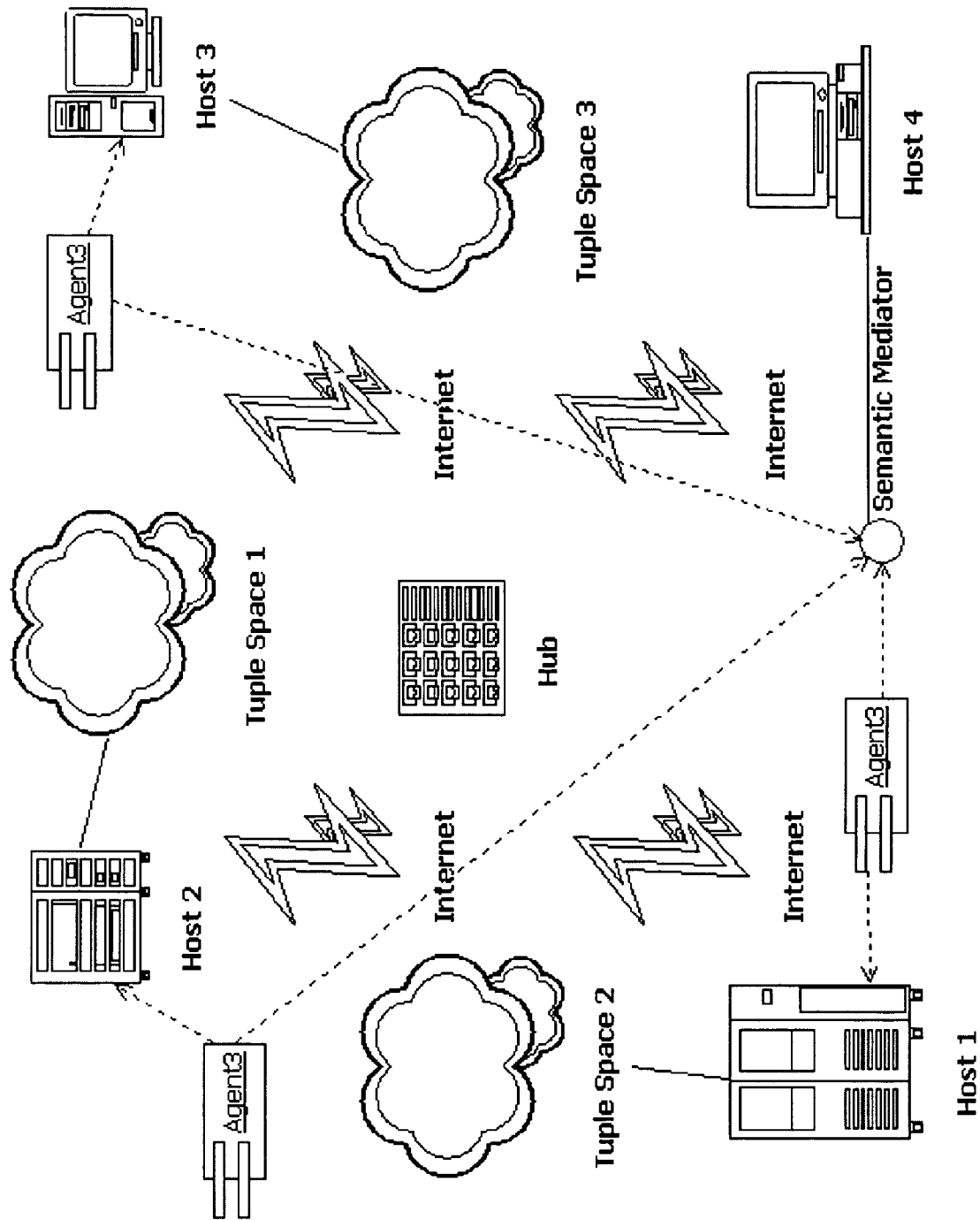

According to the invention, each object is associated with one or more semantic terms, and for each association, one tuple named with the semantic term is allocated in one or more Tuple Spaces (FIG. 2). The tuple contains the information provided by the object corresponding to the meaning of the semantic term. The allocation of the tuple allows it to be found in one or more Tuple Spaces by a matching operation using the template representing any of the conditions under which the object represented by the tuple can be produced. Each condition is associated with one or more of the semantic terms and is assumed to be present when one or more of the tuples named with any of the semantic terms can be found in one or more of Tuple Spaces. In order to represent each condition, the entity provides a template generator, which can consume any tuple corresponding to the present condition and produces the template(s) that represent it. It follows that each template generator can connect any tuple named with the semantic term of the condition to one or more of the tuples named with the semantic term associated with the object that the entity can produce under the condition. Such a template generator is called a "tuple key".

Figure 5:
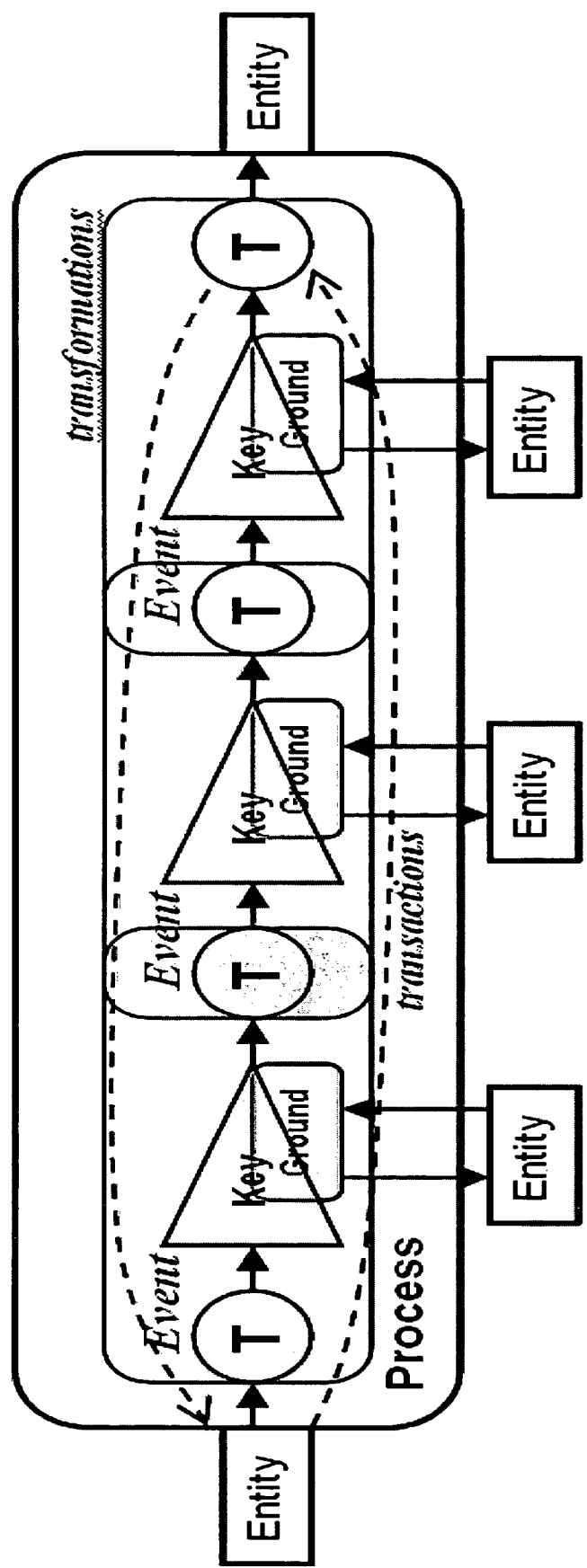

According to the invention, a process is defined by indicating one or more of the semantic terms in order to represent a goal of the process. The goal is achieved by generating chains of the event which terminate at the tuples corresponding to each semantic term. All of the chains of events must terminate in order to achieve the goal. The chain of events is generated by connecting the tuples with keys in order to represent the sequential events enabled by the cooperating entities (FIG. 5). Each event is enabled by implementing one or more processes with the goal of producing one or more objects, each associated with the tuple matching the template representing the condition present at the time of the event. The process used to produce the objects is called "ground". Each ground implements one or more chains of events starting with the input tuple corresponding to the present condition and ending with one or more output tuples each representing the object produced under that condition. (FIG. 5). The events enabled by the ground according to the invention can nest chains of events enabled by their respective grounds. Such nesting of grounds can continue for as long as necessary to reach a process implemented by a single entity independently (without cooperation), which is called an "atomic process."

If the entity requires more then one condition in order to produce certain objects, then a process is defined by indicating the semantic term for each required condition. The process is implemented by generating the chains of events, which terminate at the tuples corresponding to each semantic term. In addition, a semantic category is generated by aggregating all of the semantic terms, and one compound tuple named with the semantic category is allocated for each set of objects corresponding to all the conditions present at the same time. The compound tuple contains all of the information provided by the tuples representing the objects in the set. All of the chains of events must terminate in order to obtain a complete set of objects. It follows that the goal of the process must be achieved before the compound tuple can be found in at least one Tuple Space. The entity provides a template generator which consumes the compound tuple and produces one or more templates that represent all of the required conditions. Such a template generator is called a "category key". Like a "tuple key", it generates templates that match the tuples that represent the objects produced by the entity under the set of conditions.

Figure 6:
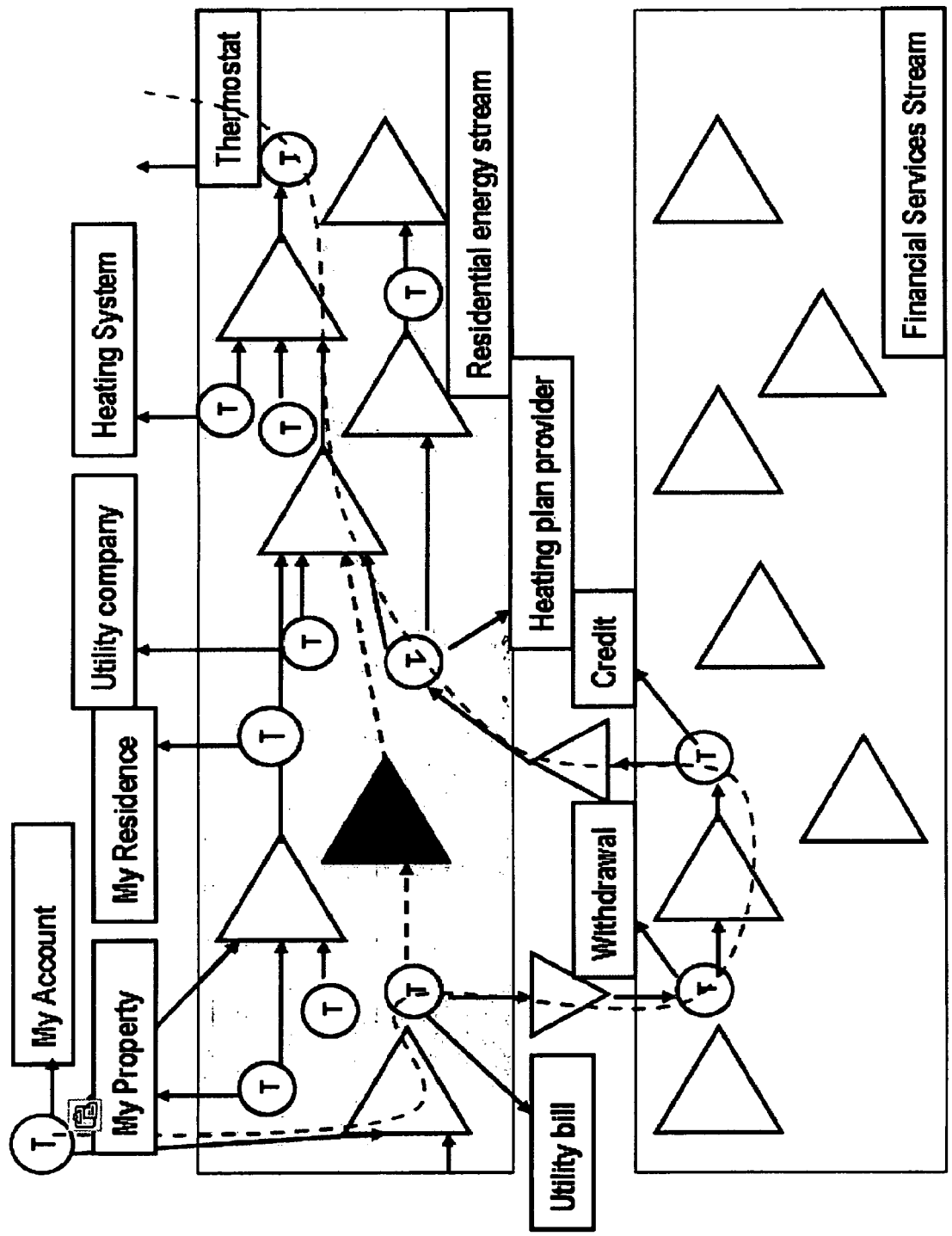
Figure 8:
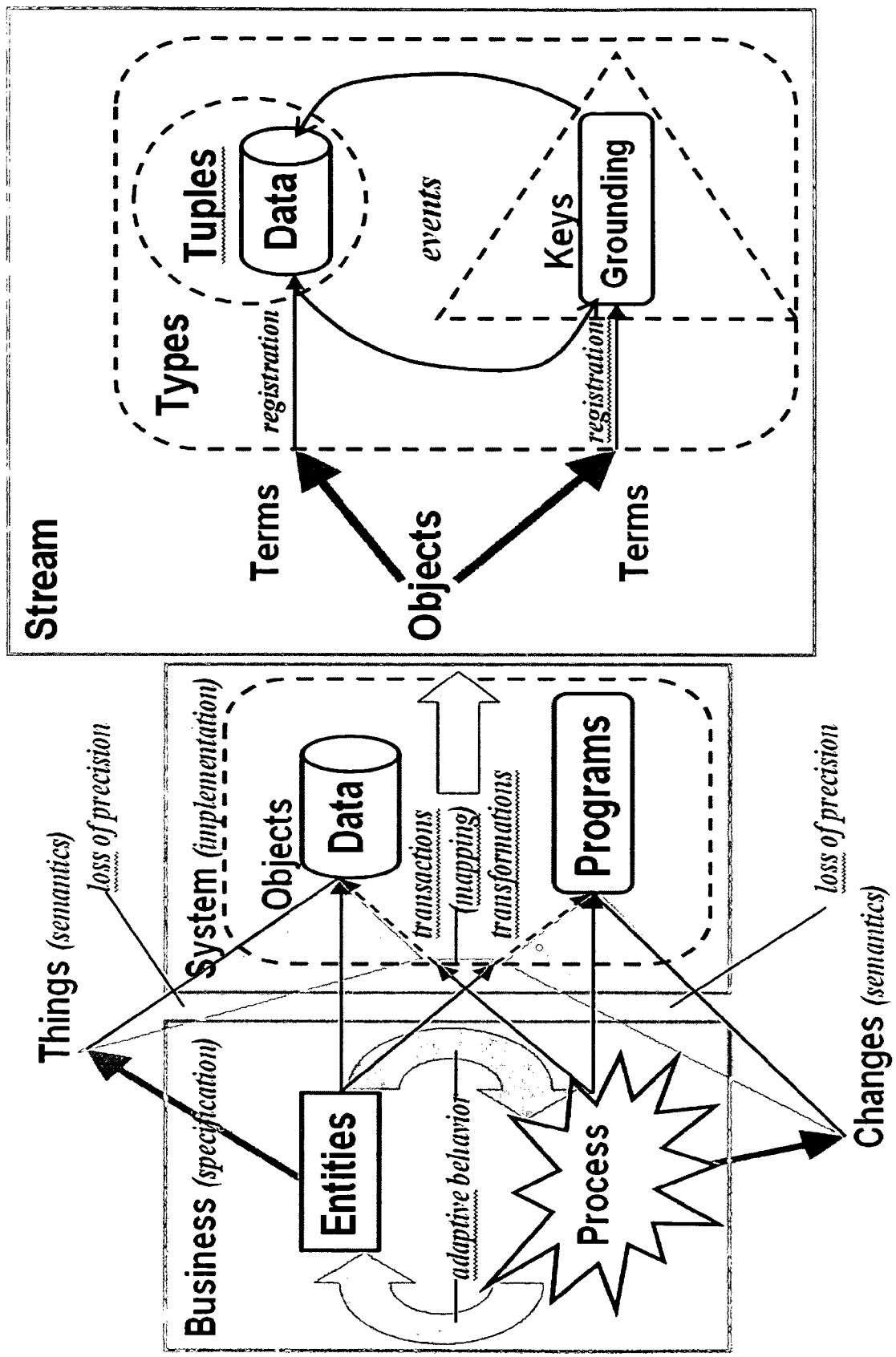

The group of mutually compatible tuples and keys form a directed graph that is called a "stream" (FIG. 6). In order to join a stream, the entity must register and designate at least one system object to represent it. The recovery of semantic precision according to the present invention results from associating one or more of the system object designed to represent the entity with one or more of semantic terms provided by the stream in which the entity registers (FIG. 8). If a system object is produced by the entity for consumption by other entities taking part in cooperation, then every time the object is associated with a semantic term, one tuple is allocated, which contains the information provided by the object and corresponding to the meaning of the semantic term. If a system object is used by the entity to implement a ground (grounding entity), then every time the object is associated with a semantic term one tuple or category key is provided by the entity for every condition used by the ground. The set of all tuples and keys associated with the same semantic term is consistent with formal definition of type as a collection of arguments (keys) for which the said function has values (tuples). Therefore, each stream created in accordance with the invention contains a tuple-based type system, whose types are called "tuple types".

According to the present invention, the cooperation of the entities is mediated by one or more of "semantic mediators", which provide access to one or more streams. In order to cooperate, entities register into a stream as providers of the objects, consumers of the objects or grounding entities. If the process itself is a ground for another process, then the grounding entity is both consumer and provider in the ground process (FIG. 5).

Each atomic process takes place in one particular locality called a hosting environment. An entity implementing an atomic process uses a hosting environment in order to receive and parse the objects represented by input tuples, and to assemble the objects represented by the output tuples. For this purpose the entity uses a container inside the hosting environment providing access to all the system objects that the entity had registered as tuples or tuple keys of a particular type. Therefore, the access to each entity cooperating in the process is provided by a hosting environment through a corresponding type container. Different type containers are shown as triangles in FIG. 6, which also shows semantic terms (rectangles), tuples (circles) and processes enabled by cooperating entities (broken lines).

Figure 7:
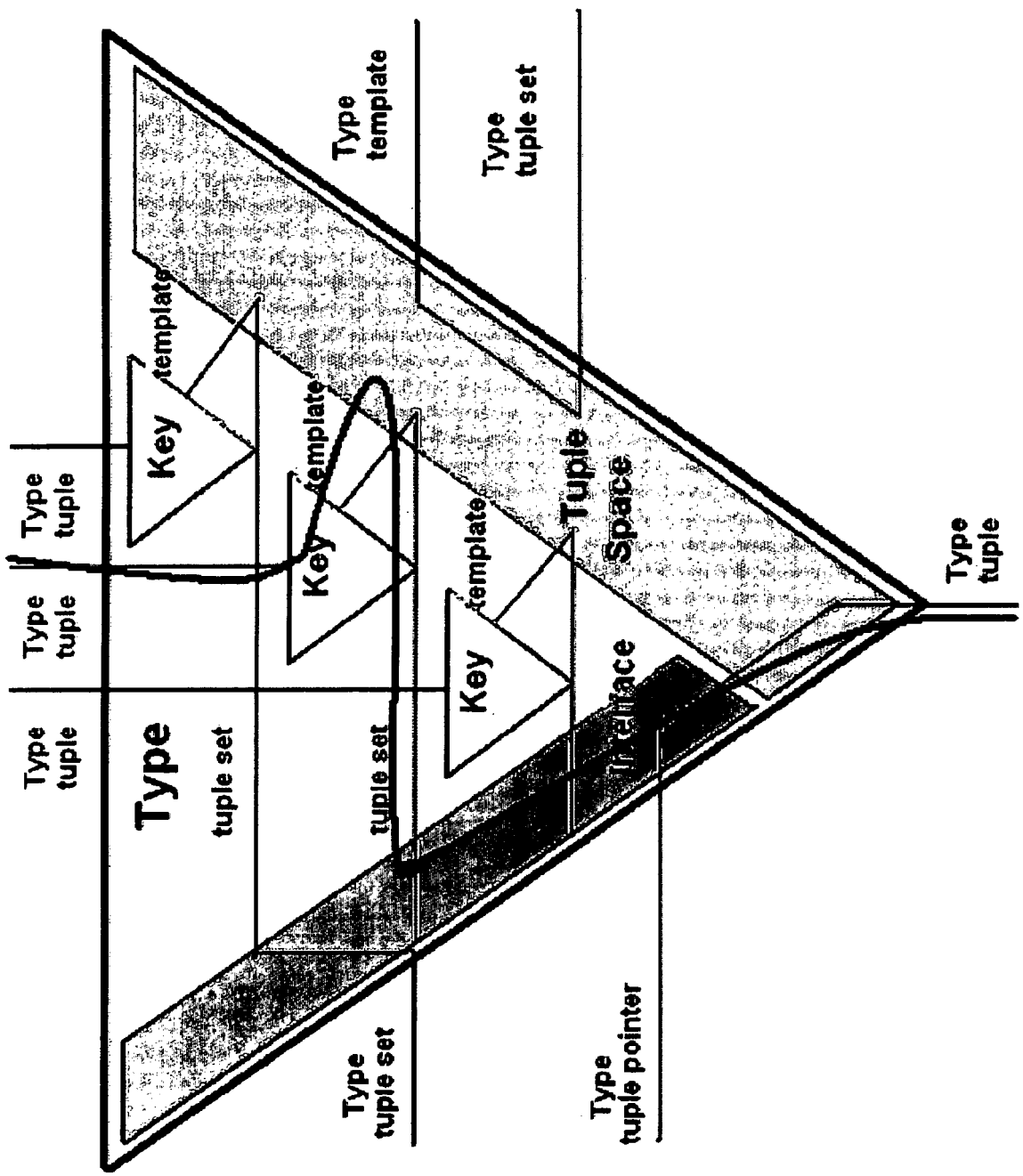

One or more type containers also utilize the hosting environment in order to implement a Tuple Space for allocating tuples, which can be matched with templates generated by tuple keys (FIG. 7). One or more type containers also utilize an interface, which allows other processes running in the hosting environment to communicate with the process implemented in accordance with the present invention. The interface allows translation between the object address (pointer) in the hosting environment's addressable memory space and the pointer to the tuple representing the object. The interface (referred to below as an "application interface") allows different applications utilizing the host's addressable memory space to adjust the process depending on resources of the hosting environment and other factors. To illustrate the use of an application interface, FIG. 7 shows a set of tuples matching a template generated by a tuple key, which is translated into a set of pointers in the host's addressable memory space. Then, the pointer to the object chosen by any other application (due to resource availability, user of application preferences or other such factors) is translated back into the tuple pointer. This demonstrates how chains of events generated in accordance with the present invention (shown as curved line on FIG. 7) can be altered by other applications while still satisfying the constraints of the tuple type, which are defined by its tuple keys. Thus, the application interface implemented in accordance with the present invention allows dynamic and seamless integration of applications.

A tuple type system of a stream comprises the image of a process, which is free from semantic distortions introduced by system objects representing cooperating entities (FIG. 8). The ground for each key is encapsulated within the type container, and has no impact on the definition of a process. At the same time, the type system is grounded in the strong references to the entities. In other word, the semantic terms associated with a stream have strong references provided by the type system and thus allow unambiguous communication between the entities registered in the same stream. In addition, streams can maintain semantic translation of terms when communication spans multiple streams, and prevent conflicts in their interpretation.

When more then one entity is registered into a stream and at least one process is defined, the semantic mediator begins to generate chains of events in order to reach the goal of the process. It begins by using the types available in one stream. After all qualifying chains of events are found, all the entities that have registered keys participating in one or more chains are notified. The entities then reply to confirm the grounding of each key. After all necessary chains of events are confirmed, the distributed transaction can be executed by following each chain of events and requesting entities to deliver the objects corresponding to grounding (FIG. 5).

If no qualifying chains of events are found for one or more terms in the definition of the process, or if a qualifying chain of events was not fully confirmed within a time-frame required by a transaction, then additional tuples or keys or transformation of existing tuples or keys can be requested from all entities registered in the stream (FIG. 5). If no chains were found or generated in a stream for the given process definition, then other streams can be searched for possible connections of tuples allocated by different streams, but associated with semantic terms not used by another stream (FIG. 6). In that case, the entities representing tuples on different sides of a cross-stream connection (bridge) must provide keys for tuples of the type not existing (alien) in the stream where they are registered. In order to obtain the keys connecting two or more streams, Semantic Mediators make the references contained in each alien types available to the entities. The Semantic Mediator must also notify the entities about references added or removed from the types for as long as the connections are used. The task of maintaining alien types may be delegated by the entities to a specialized entity called agent, which would make cross-stream connections appear to be regular by registering a key in each stream (FIG. 6)

The present invention allows strong references to be connected by tuple keys which are part of one or more streams. The tuple key of the present invention provides a connection between tuples in one or more Tuple Spaces. In the prior art, a relational database key (also, a hyperlink, a spreadsheet, a software program, and the like) connects tuples. This is an inferior process for at least the following reasons:

1. Tuples of relational database (records) do not incorporate strong references.

2. Tuples in hyperlinks do not have sound formal semantics.

3. Tuples in software programs are associated with type systems, and can have strong references, but programming types cannot be aggregated into categories outside of the program. That is, a program is needed to aggregate types of a given programming language. Hence, any change in a business process requires re-programming.

4. Tuples allocated using system object containers (described below) don't have sound formal semantics.

II. Detailed Disclosure

Figure 4:
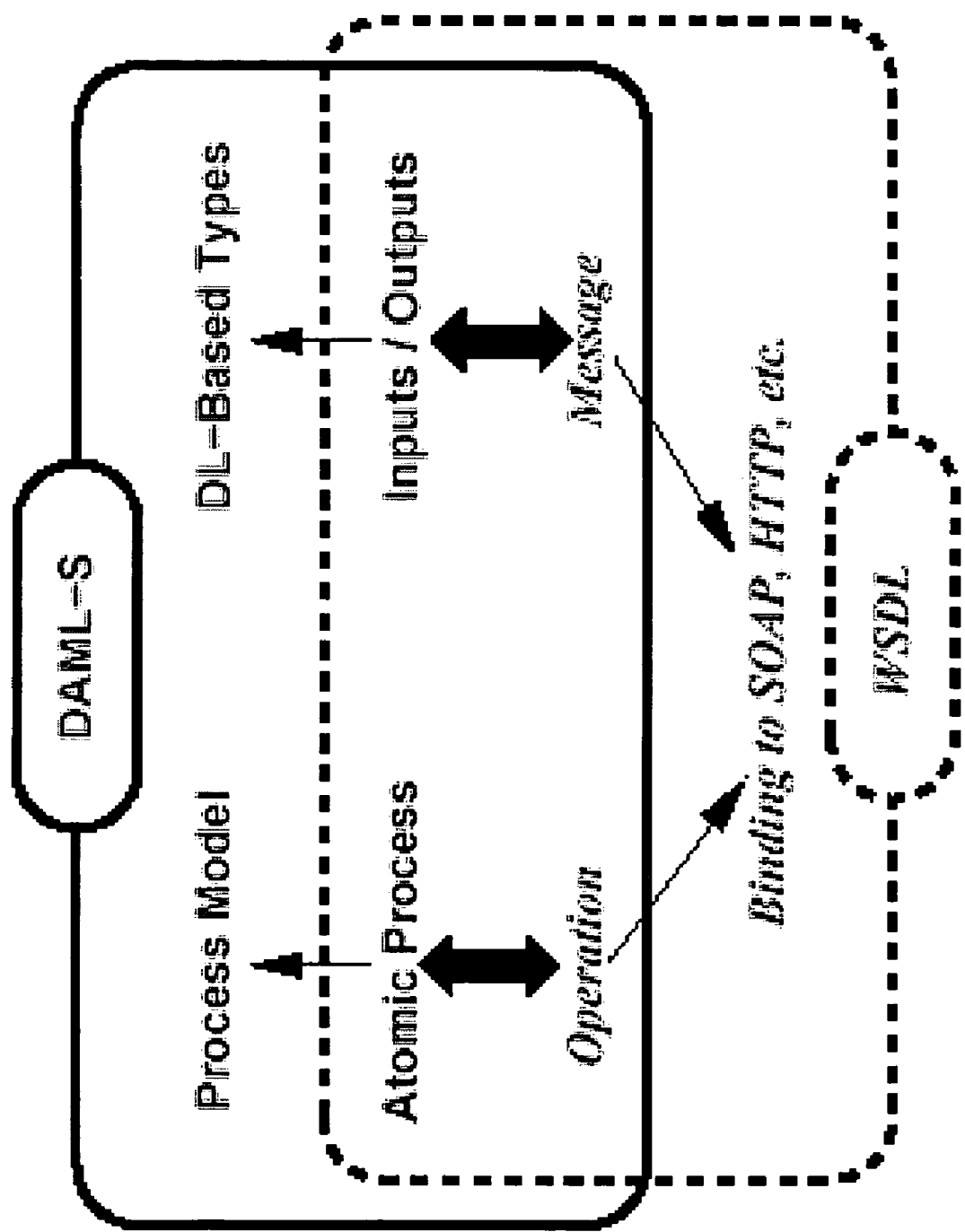
Figure 10:
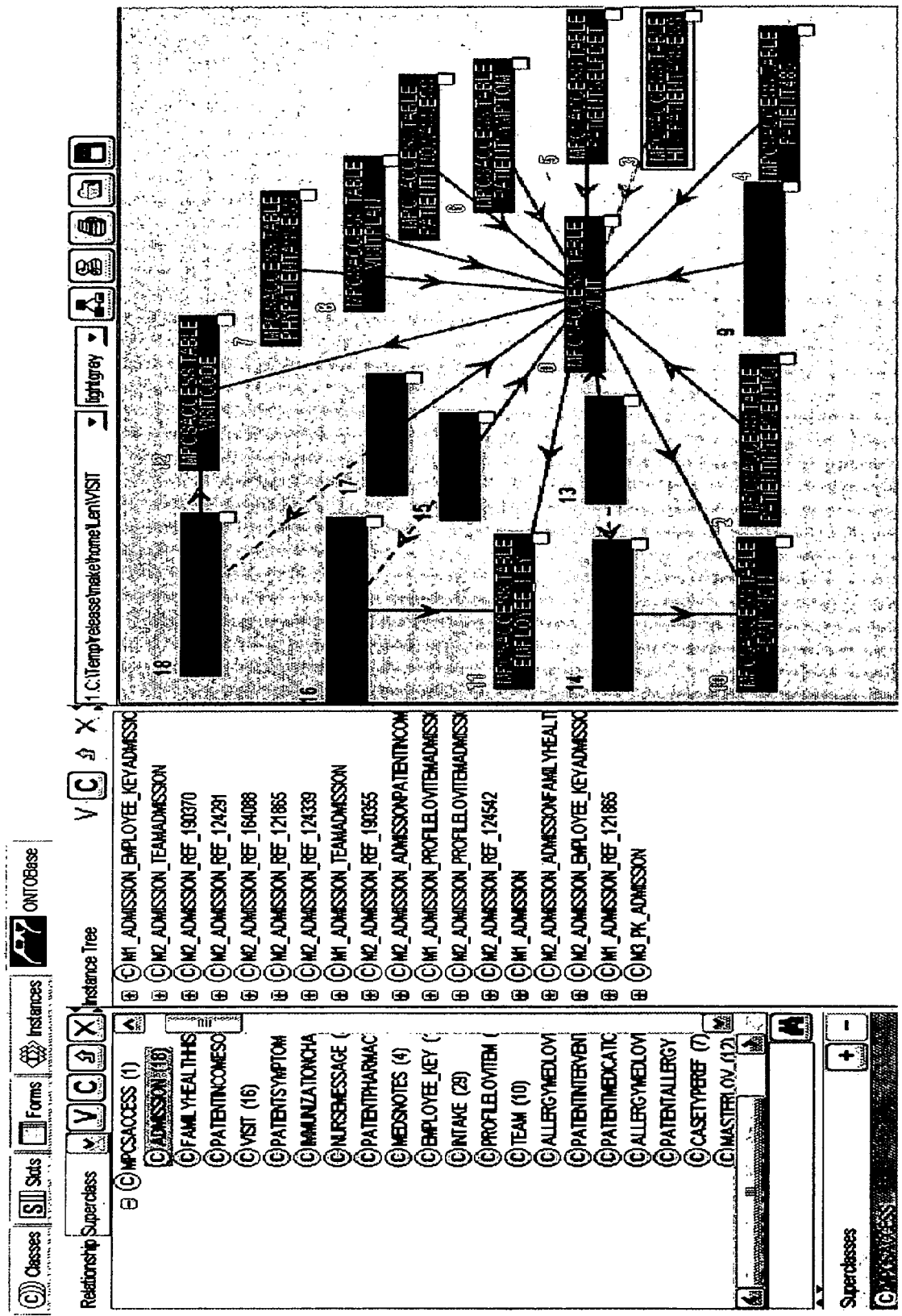

Consider an entity represented by system object containers (FIG. 10). In order to cooperate with other entities, the containers are bound to transport by means of some object broker, such as Simple Object Access Protocol (SOAP). Inside each container, the objects produced by the other entities and arriving via transport are parsed and transformed into internal objects, some of which may be stored in a database. The objects produced by the entity (at the request from the other entities) are assembled and packaged for transport. When packaged objects are received by the entity, they are treated according to types provided by a type system agreed to by all entities using the same transport (e.g., XML schema). Such type system, however, cannot provide constraints required for sound formal semantics of interactions between entities. One method presently addressing this shortcoming uses an additional type system to provide sound formal semantic of the interactions. For example, DARPA Agent Markup Language (DAML) modified to include an Ontology Inference Layer (OIL) can be used as a type system, and provides a basis for sound formal semantics called Description Logic (DL). DAML+OIL supports arbitrary XML Schema datatypes. This is facilitated by maintaining a clean separation between instances of object classes (defined using the ontology language) and instances of datatypes (defined using the XML Schema type system). In this manner, the ontology language can specify constraints on data values. However, as data, the values can never be instances of object classes and they cannot apply additional constraints to elements of the object domain. This allows the type system to be extended without having any impact on the ontology language, and vice-versa. FIG. 4 shows the semantics of Web Service in DAML-S extended from basic Web Service Description Language (WSDL) using two separate parts: atomic process semantics provided by DAML instance, and inputs/outputs semantics, provided by DL-based Types.

However, the use of two separate type systems for the same process leads to the loss of semantic precision. Translating this to the real-world would mean that physical "things" participating in a process can be modified without impacting the process, which is semantically inconsistent. However, since most of the systems participating in a business process are designed using multiple imprecise representations, such semantic inconsistencies partially offset each other. This situation fundamentally limits the semantic precision of systems. In contrast, a process implemented according to the present invention is formally defined within a single type system, which is used to define both production and transport of the objects by the cooperating entities. Specifically, a global type system of a stream where the entities are registered encapsulates (hides) local type systems used by different systems and transport mechanisms representing the entities. Moreover, Tuple Space technology used to construct the stream provides both portability and security required by such a global type system.

Figure 9:
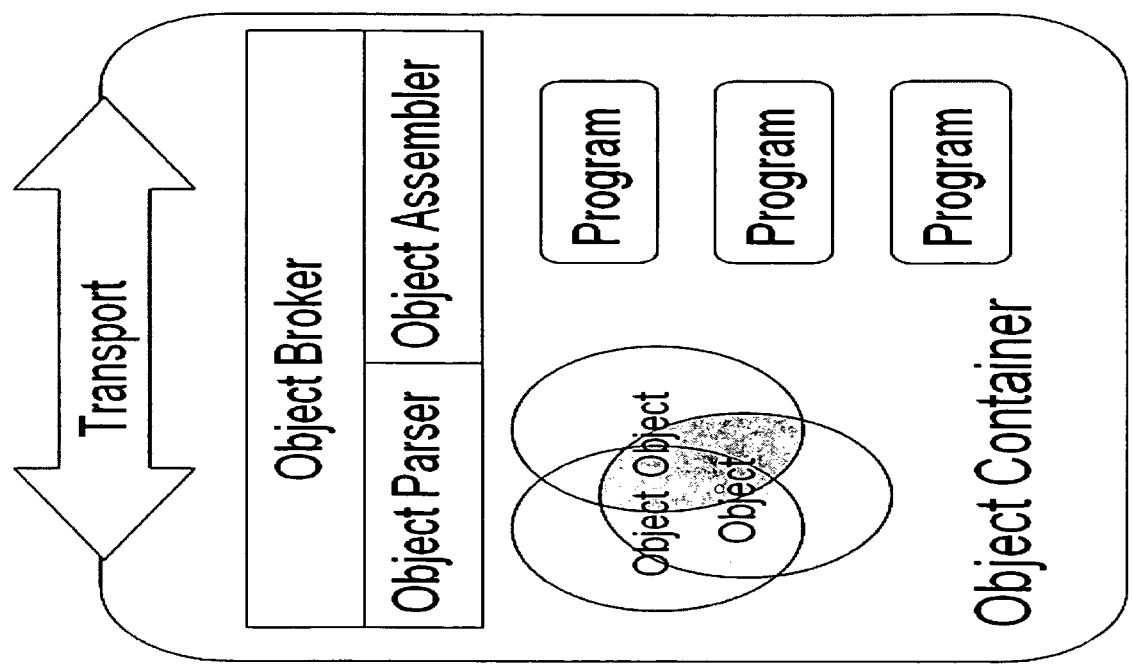
Figure 9:
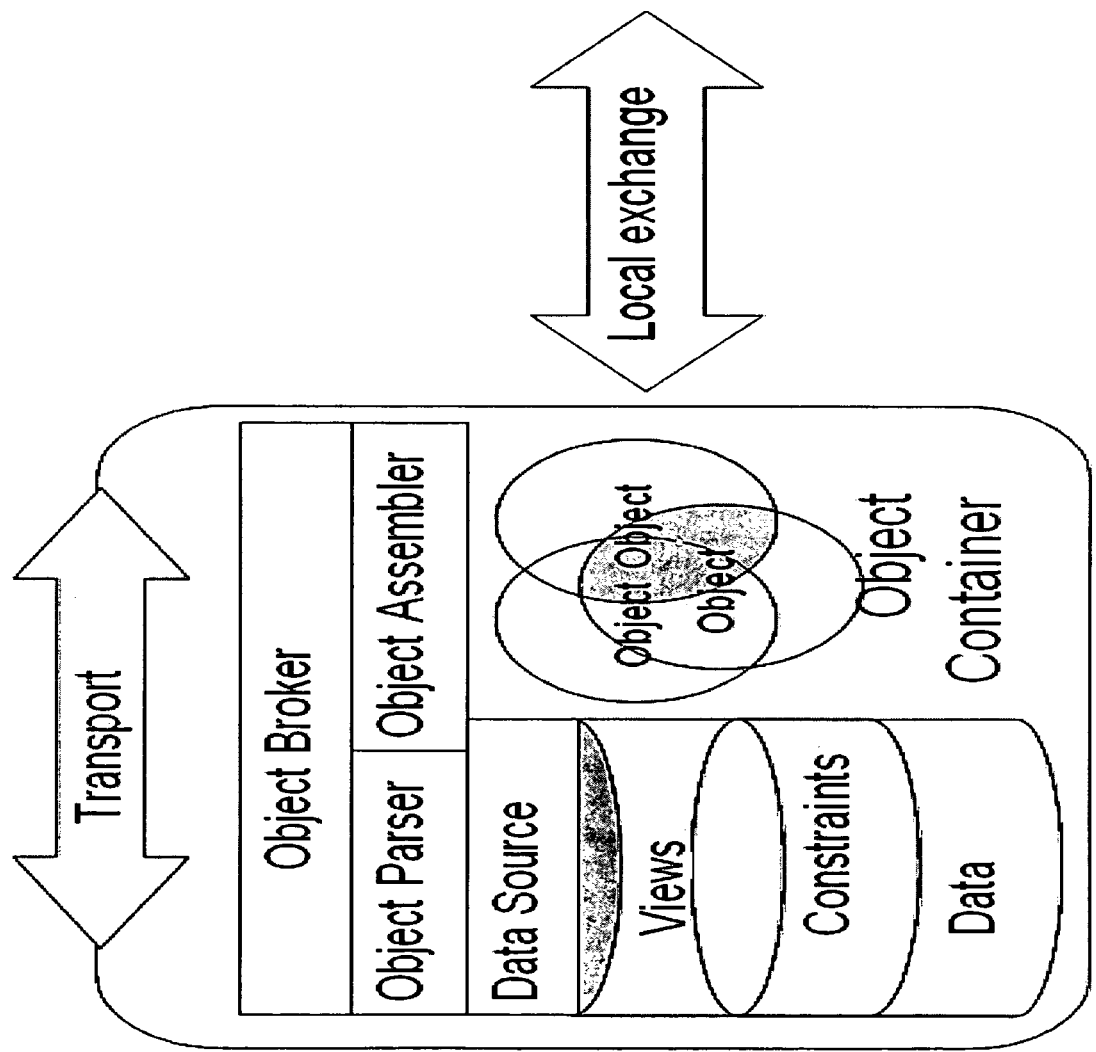
Figure 19:
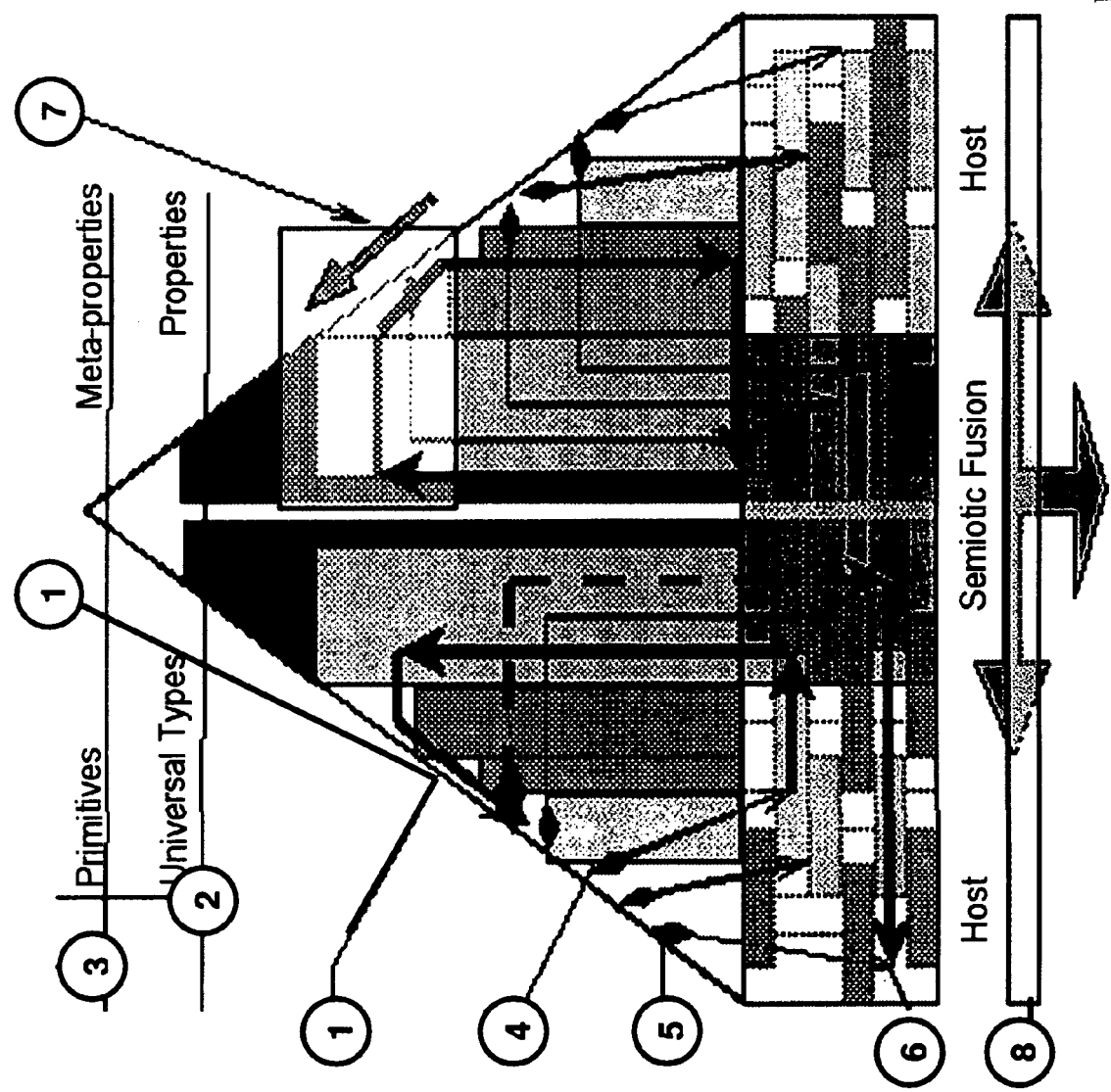

A formal semantics of tuples, including semantic terms and tuple type system, necessary to construct a stream, can be obtained from system object containers (FIGS. 8, 9) manually, automatically or semi-automatically depending on the properties of the container. For example, if system objects are managed by a relational database serving as a system container, then their semantics are provided by tables and referential constraints used to preserve the integrity of records in the database. However, the records themselves cannot provide accurate representation of system objects semantics, since the same record can be used to represent many objects (the objects are compressed by the database). The retrieval of objects from the database (decompression) is done by an object assembler, which performs further association of the records with semantics of interfaces exposed by the container (FIG. 10, left). In addition, several layers of interfaces may be involved in transforming the objects before they leave the container, and most of associations are privately defined by the container provider. In contrast, according to the present invention the references to all of the objects associated with the semantic term must be made available to a semantic mediator by the registered entities. Therefore, no association can be absolutely private. Instead the semantic mediator provides the level of privacy and security necessary and sufficient for a specific process of cooperation. The properties of a stream allowing the Semantic Mediator to control the process are, in turn, determined by one or more Tuple Spaces used by the type system of the stream and are called meta-properties (FIG. 19).

Following is an implementation (embodiment) of the present invention using as a hosting environment a frame system (developed by Stanford Medical Informatics at the Stanford University School of Medicine) called Protégé. The embodiment allows the entity called "Mobile Patient Charting System" (MPCS) represented by system objects stored in the prior art relational database system container (developed by ORACLE corporation) to register into a stream provided by a semantic mediator called "OntoBase" and implemented using Java programming language and the Protege hosting environment. The embodiment is based on the Tuple Space, which is also implemented using Java and Protege.

In the preferred embodiment of the present invention, a system container is used for constructing a stream where all system objects are registered. The stream is constructed by a semantic mediator upon the registration of database (Java source code is provided in Part 1 of the Appendix). The stream is constructed in a form of a frame-based ontology (comprised of three separate files in Parts 3-5 of the Appendix). A frame-based ontology can be read and interpreted by many frame systems, as well as translated into a more general format known as Resource Description Framework (RDF).

The screenshot of FIG. 10 shows the MPCS stream constructed by reverse engineering of an MPCS Access database. Ontology of the stream provides formal semantics of all registered system objects. For example, the term "ADMISSION" is taken from the name of the database table used to store a portion of the system object corresponding to the table's primary key. Accordingly, all tuples allocated for system objects associated with that term have formal semantics of unique admission of a patient in the Mobile Patient Charting System. In MPCS ontology, formal semantics of tuples are stratified into three meta-levels marked as M1, M2, M3, and corresponding to the levels defined by the Model Driven-Architecture (MDA) standard.

Figure 3:
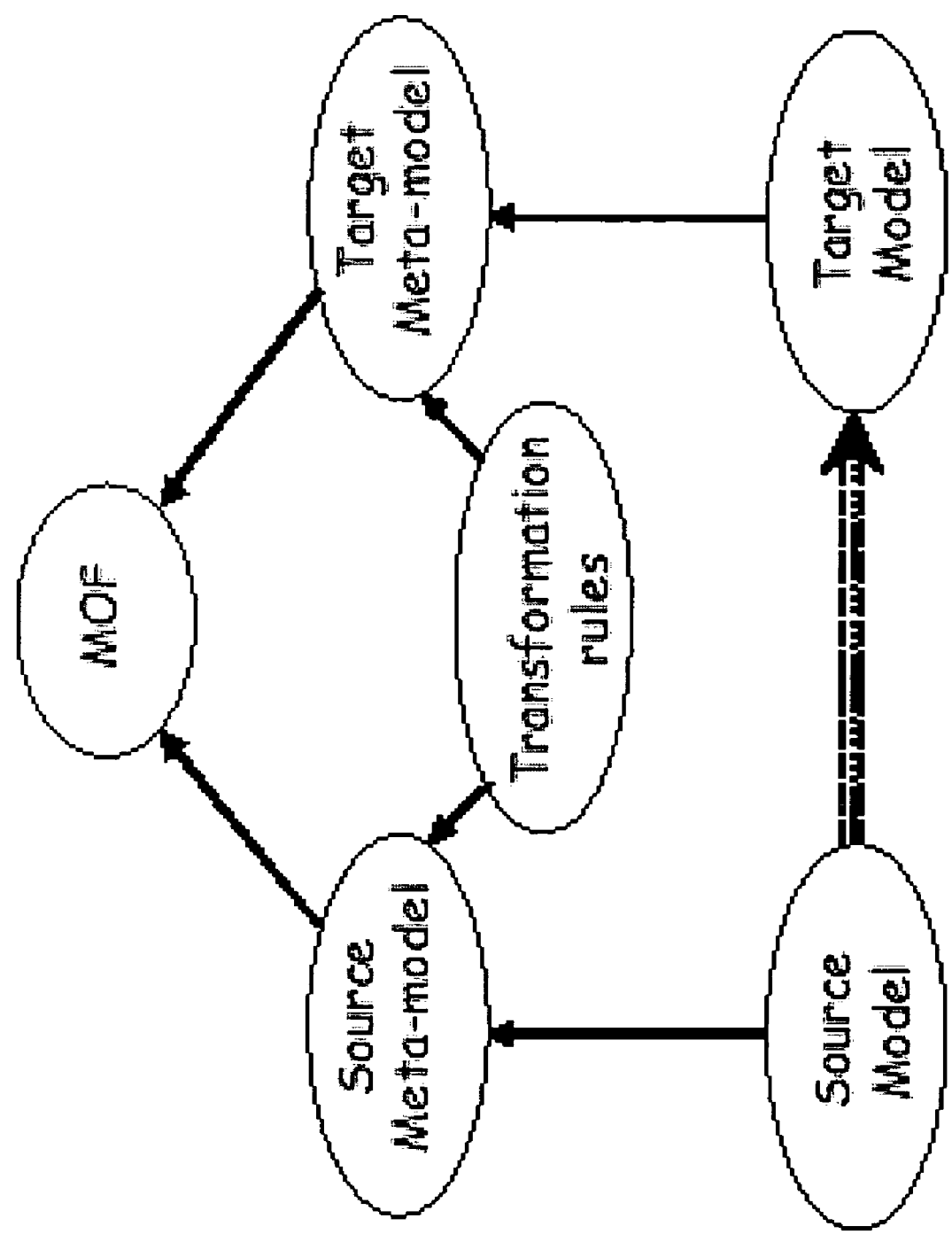

The latest attempt by the industry to bring coherence to business modeling and implementation is Model-Driven Architecture (MDA) promoted as the architectural framework. It is based on four increasingly abstract levels (M0-M3) of modeling enabled by its Meta-Object Facility (MOF). These levels are designed to allow the mapping of different models to each other at each level (i.e., horizontally). The vertical dimension is used to compress the mappings at the lower level by linking them to ones at the higher level. One example of using that technique is mapping of Platform-Independent Models (PIM) to Platform-Specific Models (PSM), which involves the mapping of the implementation platforms by using transformation rules at the M2 level in order to facilitate the mapping of application models at the M1 level (FIG. 3). The M3 level defines formal semantics of MOF.

According to the present invention, formal semantics of tuples include their associated semantic terms, categories and tuple types. Correspondingly, the M3 level is used to represent the semantic terms (also called primitives), the M2 level is used to represent the tuple types, the M1 level is used to represent aggregated categories, and the M0 level is used to allocate the tuples. In contrast to MDA, all three meta-levels (M1-M3) comprising ontology of a stream define its formal semantics. Moreover, due to the grounding of tuple types into strong references to the entities represented by the types, the soundness criteria create two-way vertical dependency between all four levels (M0-M3).

Figure 11:
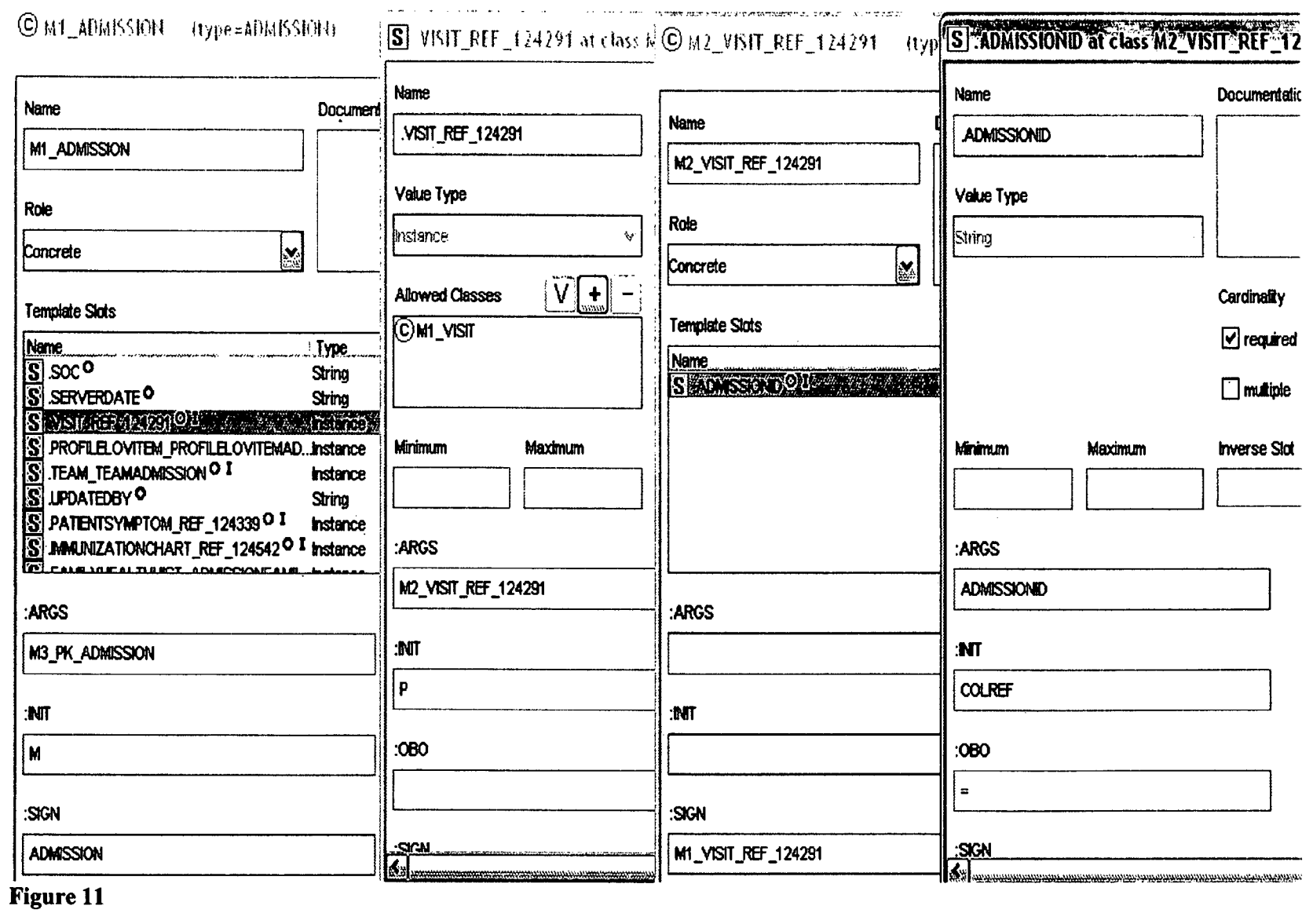

The screenshot in FIG. 11 shows the relationship of meta-levels. The M1 level defines one class for all objects associated with one semantic category (e.g., "ADMISSION"). In the frame-based implementation (embodiment), each M1 frame represents all semantic terms aggregated by the category as slot frames. Each M3 frame defines the set of tuples allocated as instances of the class corresponding to the category. Each set is defined as template matching the instances of the class (e.g., M3_PK_ADMISSION defines a template matching the instances of M1_ADMISSION.) Both classes and slots are frames, which can refer to other frames. For example, the slot VISIT_REF__124291 refers to class M1_VISIT, whose instances represent the objects required by the entity to produce the objects represented by instances of class M1_ADMISSION. The slot indicates that the presence of one or more of M1_VISIT instances is a condition leading to one or more of M1_ADMISSION instances. The slot also indicates the inverse condition (by a symbol "I" next to it on FIG. 11), which allows production of one or more of M1_VISIT instances when at least one instance of M1_ADMISSION is present. This condition is represented by the M2_VISIT_REF__124291 frame, which defines a template for matching M1_VISIT tuples allocated as instances of the M1_VISIT_REF__124291 sub-class of M1_VISIT class. In this manner, the M2 frame connects the tuples allocated by one M1 class to the tuples allocated by another M1 class. The tuples are allocated at the M0 level, which in a frame system is implemented as instance frames (M0 frames.) The code in Part 2 of the Appendix generates a tuple in response to one of the conditions represented by a tuple key. The result is shown in FIG. 13. The tuple corresponding to the ADMISSION object is allocated as the M0 frame, which contains all information related to patient admission and represents the object stored in the database.

A "facet" is a mechanism used by frame systems in order to generate instance frames. In the described implementation (embodiment) of the present invention, facets generate tuple templates to represent the conditions under which the entity can produce one or more of the objects (FIG. 12). For each connection represented by the tuple key, there is a facet which generates a template (M3 frame) that matches tuples allocated as instances (M0 frames). All keys and tuples associated with the same semantic term comprise a tuple type (shown as a triangle in FIG. 12 and FIG. 7).

Figure 1:
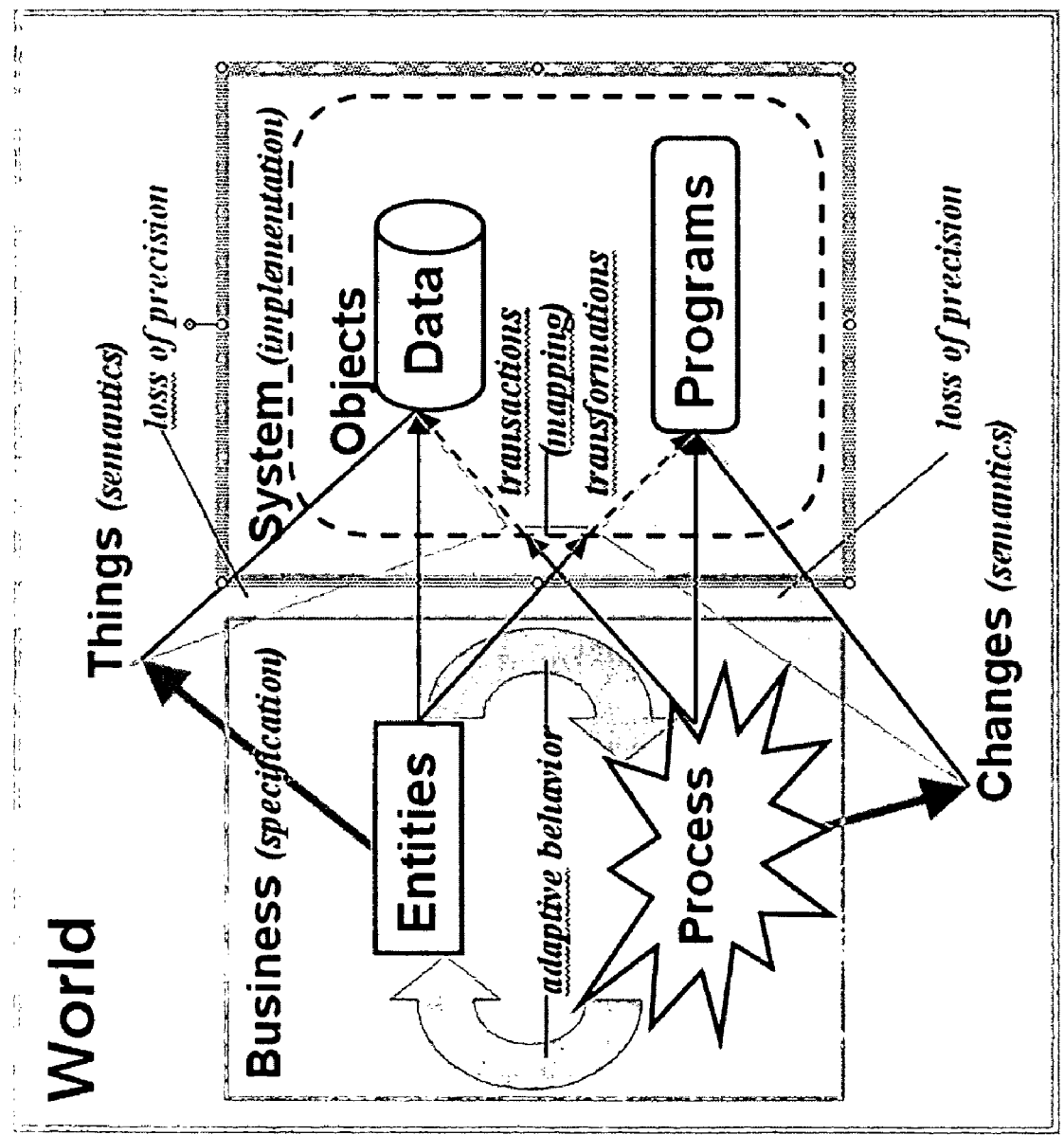

The preferred embodiment the present invention creates a tuple type container encapsulating the grounding of each tuple key. In addition, it provides public access to all semantic associations and corresponding tuples (called "Semantic Interface" in FIG. 12) thereby avoiding any loss of semantic precision. In other words, it implements a public type system with strong references. The logic previously incorporated in private transformations done by system programs (FIG. 1) is incorporated in the frame ontology and made public via the Semantic Interface. Moreover, the logic is not fixed in the code of programs, but is only constrained by tuple keys, which can be added, modified or removed.

The interpretation of the logic contained in the frame ontology is performed by so called "reasoners", which can be provided by the container or by external services, such as Semantic Mediators. The reasoners generate chains of the events represented by tuple connections which terminate at the tuples corresponding to semantic terms defining the goal of a process. The process is defined by indicating one or more of the semantic terms corresponding to ontology classes. The entity's application interface (FIG. 12) allows other entities to indicate one or more classes in order to represent each request as a goal, which requires a corresponding process to be implemented. If classes are not already present in the entity's semantic interface, then its application interface loads new classes into the ontology.

The ontology generated by reverse engineering of system containers representing an entity must undergo alignment and unification with ontologies representing different entities before cooperation of the entities can be enabled by mutually compatible tuple types of a stream. According to the present invention, the alignment and unification is done by semantic mediators and results in the "upper" ontology comprised of semantic categories (M1 level). The upper ontology of each stream is derived from the Standard Upper Ontology (SUO).

In the Semantic Web based on the present invention, the Web Services are grounded into the type containers (FIG. 14, triangles), and registered by entities (black arrows) under the terms of upper ontology. Each type container utilizes its semantic interface and upper ontology navigator provided by a Semantic Mediator in order to find or generate semantic terms for registering system objects of a particular type. The entity can utilize the "reasoner" (shown as "processor" in FIG. 14) to find or generate semantic terms. The algorithms implemented by reasoners analyze or generate chains of events formed by connected tuples. Multiple interconnected chains of events form the mathematical structure called a hyper-graph. All reasoners used to implement the present invention are called hyper-graph processors and perform similar computations, although used by different parts of the architecture. The chains of events found or generated by different processors are shown as broken lines in FIG. 14. The set of all possible chains of events is called "Theory" of a given distributed system because it can be used to explain any behavior of the system.

FIG. 14 shows various chains of events (broken lines) calculated by different processors depending on the scope of a process. The right hand side of FIG. 14 shows chains of events used by ground processes implemented by one or more grounding entities, and involving one or more hosts. Some of the entities may use frame-based type containers (shown as a framed area), other type of containers may utilize different methods to generate the ontology and bind it to Tuple-based type system. Each chain of events connects two tuples (FIG. 5) allocated in one or more Tuple Spaces (FIG. 14). The entities may utilize the nearest available processor to generate the chains of events. For example, one grounding entity using frame ontology grounded into tuple type containers bound to the same host can utilize the processor implemented by the frame system and rely on frame logic to generate the chain of events. FIG. 15 shows a simple chain of events connecting tuples representing the objects recovered by reverse engineering of a database. The source tuple used in this example corresponds to the semantic term "ADMISSION", and was previously generated by the same frame-based implementation of the present invention (FIG. 13). The target tuple was generated by finding connected tuples to represent sequential events in the chain terminating at the tuple corresponding to the semantic term "PATIENT" (shown on the right of FIG. 15).

Each chain of events belongs to one of tree graphs comprising the "theory" hyper-graph. The "unified theory" hyper-graph obtained by alignment and unification of individual ontologies can be used to generate global chains of events spanning multiple tuple type systems and hosts (FIG. 14). The generation of such global chains of events may require one or more hyper-graph processors. It may also require generating new semantic categories by aggregating the semantic terms from one or more ontologies (FIG. 20).

Semantic mediators allow entities to register multiple type containers as streams representing individual entities. When a semantic mediator finds mutually compatible types in the streams registered by different entities, it can propose that respective entities merge their streams and create one or more shared streams. Merging of streams can be done with agreement of all entities. When one or more processes are defined in the stream, the entities can register into the stream as providers, consumers or grounding entities for any process by binding one or more of its type containers to a transport used by the Web Service (FIG. 14). The grounding of Web Services can be done by the entity joining one or more streams described using a Web Service Description Language (WSDL), wherein tuples are bound to input and output messages and tuple keys are bound to operations (triangle on FIG. 16).

The overall organization of OntoSpace includes multiple ontologies and tuple type systems (streams) sharing one or more Tuple Spaces. It can be used as the Semantic Web architecture as well as future global (grid) computing architecture.

Figure 18:
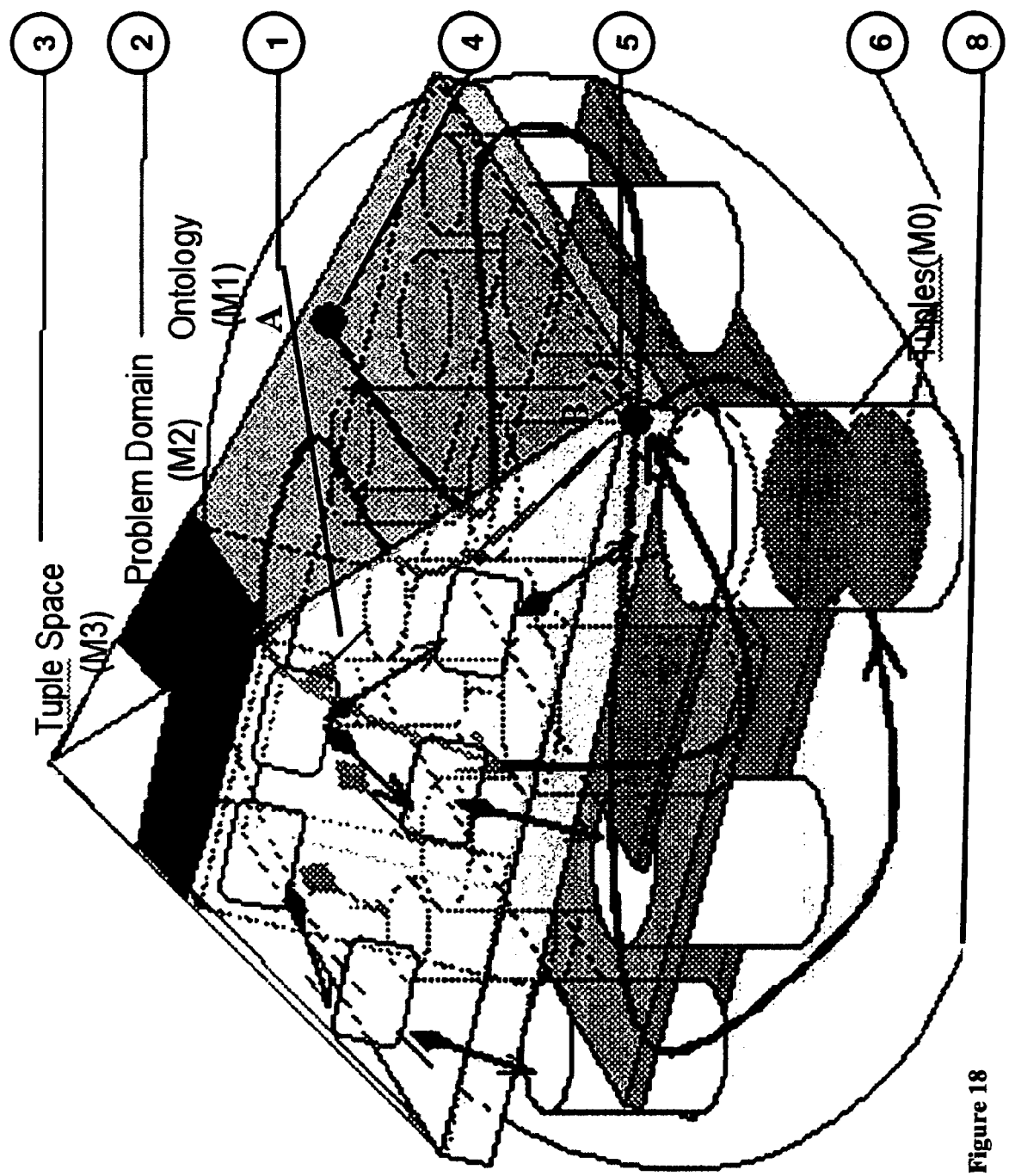

FIGS. 18-20, taken together, and connected as shown in FIG. 17, shows a detailed organization of OntoSpace. Each stream is stratified (layered) into M0-M3 meta-levels. Multiple streams share one or more Tuple Spaces defined by semantic terms used to allocated tuples (M3 level). Each stream has its own types system defined and maintained as its "Problem Domain" (M2 level). Chains of events are generated by reasoners using one or more upper ontologies (M1 level). The organization is therefore a pyramid of shared layers with the most common layer at the top. However, in contrast to MDA organization, the top-most M3 meta-level and the bottom M0 level have two-way dependencies resulted from strong references.

Referring to FIGS. 18-20, the strong reference is shown as a vertical (yellow) channel connecting M3 and M0 levels. The sets of tuples associated with one semantic term are shown as cylinders, and connected tuples are shown as (color) plates. Classes at the M1 level define and allocate connected tuples (as was demonstrated by the embodiment). The source (point A) and the target (point B) tuples (FIG. 15) are designated as categories of ontology at the M1 level. All meta-levels are used to generate the chain of events (shown in FIGS. 18-20 as red lines at M0, and blue lines at M1). M2-M3 levels participate indirectly by providing access to different Problem Domains and Tuple Spaces (FIGS. 18-20 top).

OntoSpace architecture allows all reasoners to use the same computational model based on a hyper-graph representation of connected tuples (FIG. 14). Such reasoners (hyper-graph processors) can be used anywhere in OntoSpace, and the processing load can be shifted without translating semantics of different systems, which is the main objective of the Global Computing Grid.

The use of shared meta-levels also allows dynamic integration of different systems. This, however, requires meta-levels to be synchronized across the OntoSpace. Such synchronization of OntoSpace is mathematically formulated as hyper-graph transversal, which was proven to be feasible in some cases. None of the existing methods of global synchronization provides for uniformed computational model suitable for the Global Grid. OntoSpace provides such model.

The present invention may be implemented with any combination of hardware and software and may be also implemented as a service. If implemented as a computer-implemented apparatus, the present invention is implemented using means for performing all of the steps and functions described above.

The present invention can be included in an article of manufacture (e.g., one or more computer program products) having, for instance, computer usable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer implemented method of allowing entities to cooperate for implementing at least one process, the method being part of a computer system, comprising:
   (a) producing objects by at least one entity;
   (b) associating each of the objects with at least one semantic term, said associating done by the at least one entity;
   (c) allocating a tuple to each of the at least one semantic terms, the tuple containing information provided by each of the objects corresponding to a meaning of the at least one semantic term, allowing the tuple to be found in at least one tuple space;
   (d) storing and retrieving information in the form of the tuple;
   e) using the tuple to represent each of the objects involved in the at least one process, wherein at least one tuple type is registered by the at least one entity;
   (f) representing conditions, under which the at least one entity can produce at least one of the objects by using at least one tuple template, the at least one tuple template generated by the at least one entity;
   (g) associating the at least one tuple template and the tuple with the at least one semantic term to form a type;
   (h) indicating the at least one semantic term in any order to represent a goal of the at least one process; and
   (i) generating streams representing chains of events composed of sequential events which terminate at the tuple corresponding to each of the at least one semantic terms.

2. The method of claim 1 further comprising:
   (j) generating semantic categories by aggregating any of the at least one semantic terms in any order.

3. The method of claim 1, further comprising:
   (j) replacing the at least one tuple template from the tuple, wherein the at least one tuple template and the tuple are of the same tuple type.

4. An apparatus for allowing entities to cooperate for implementing at least one process, the apparatus being part of a computer system, comprising:
   a processor for:
   (a) producing objects by at least one entity;
   (b) associating each of the objects with at least one semantic term, said means for associating done by the at least one entity;
   (c) allocating a tuple to each of the at least one semantic terms, the tuple containing information provided by each of the objects corresponding to a meaning of the at least one semantic term, allowing the tuple to be found in at least one tuple space;
   (d) storing and retrieving information in the form of the tuple;
   (e) using the tuple to represent each of the objects involved in at least one process, wherein at least one tuple type is registered by the at least one entity;
   (f) representing conditions, under which the at least one entity can produce at least one of the objects by using at least one tuple template, the at least one tuple template generated by the at least one entity;
   (g) associating the at least one tuple template and the tuple with the at least one semantic term to form a type;
   (h) indicating the at least one semantic term in any order to represent a goal of the at least one process; and
   (i) generating streams representing chains of events composed of sequential events which terminate at the tuple corresponding to each of the at least one semantic terms.

5. The apparatus of claim 4 further comprising: a processor for:
   (j) generating semantic categories by aggregating any of the at least one semantic terms in any order.

6. The apparatus of claim 4, further comprising: a processor for:
   (j) replacing the at least one tuple template from the tuple, wherein the at least one tuple template and the tuple are of the same tuple type.

* * * * *